United States Patent
Montantes

(10) Patent No.: US 11,537,871 B2
(45) Date of Patent: Dec. 27, 2022

(54) DEEP NEURAL NETWORK TRAINING FOR APPLICATION PROGRAM GENERATION

(71) Applicant: FUJITSU LIMITED, Kawasaki (JP)

(72) Inventor: James Montantes, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 1282 days.

(21) Appl. No.: 15/963,011

(22) Filed: Apr. 25, 2018

(65) Prior Publication Data
US 2019/0332931 A1    Oct. 31, 2019

(51) Int. Cl.
| | |
|---|---|
| *H04L 9/40* | (2022.01) |
| *G06N 3/08* | (2006.01) |
| *G06F 40/40* | (2020.01) |
| *G06V 30/194* | (2022.01) |
| *G06F 3/01* | (2006.01) |
| *G06F 3/041* | (2006.01) |
| *G06F 40/169* | (2020.01) |

(52) U.S. Cl.
CPC ............ *G06N 3/08* (2013.01); *G06F 40/40* (2020.01); *G06V 30/194* (2022.01); *H04L 63/08* (2013.01); *G06F 3/013* (2013.01); *G06F 3/041* (2013.01); *G06F 40/169* (2020.01)

(58) Field of Classification Search
CPC ........ H04L 63/08; G06N 3/08; G06N 3/0445; G06N 3/0454; G06F 3/013; G06F 3/015; G06F 3/017; G06F 3/041; G06F 3/0488
See application file for complete search history.

(56) References Cited

U.S. PATENT DOCUMENTS

| | | | |
|---|---|---|---|
| 7,181,768 B1* | 2/2007 | Ghosh | .................. H04L 63/1408 726/23 |
| 8,442,321 B1 | 5/2013 | Chang et al. | |
| 9,324,022 B2 | 4/2016 | Williams, Jr. et al. | |

(Continued)

FOREIGN PATENT DOCUMENTS

| | | |
|---|---|---|
| WO | 2017/079795 A1 | 5/2017 |
| WO | 2017/194815 A1 | 11/2017 |

OTHER PUBLICATIONS

European Search Report in application No. 18203236.7 dated May 8, 2019.

(Continued)

*Primary Examiner* — Gil H. Lee
(74) *Attorney, Agent, or Firm* — Maschoff Brennan

(57) ABSTRACT

A computer architecture may comprise a processor, a memory, and a differential memory subsystem (DMS). A learning engine is stored on the memory and configured to present data to an expert user, to receive user sensory input measuring reactions related to the presented data, and to create an attention map based thereon. The attention map is indicative of portions of the presented data on which the expert user focused. The learning engine is configured to annotate the attention map with the natural language input labels and to train a neural network based on the user sensory input. The learning engine is configured to create a model based on the trained neural network, to provide an application program for an output target; and to instruct the output target via the application program to detect and remedy anomalous activity. The DMS is physically separate and configured for experimental data processing functions.

20 Claims, 12 Drawing Sheets

(56) References Cited

U.S. PATENT DOCUMENTS

| | | | |
|---|---|---|---|
| 9,697,444 B2 | 7/2017 | Wu et al. | |
| 2010/0004924 A1 | 1/2010 | Paez | |
| 2015/0339589 A1* | 11/2015 | Fisher | G06V 20/52 706/12 |
| 2017/0323201 A1 | 11/2017 | Sutskever et al. | |
| 2018/0302601 A1* | 10/2018 | Chen | H04N 21/25891 |
| 2019/0147300 A1* | 5/2019 | Bathen | G06N 3/0454 706/12 |

OTHER PUBLICATIONS

EP Office Action in Application No. 18 203 236.7 dated Apr. 8, 2021.

Graves. "Hybrid Computing Using a Neural Network with Dynamic External Memory" Nature. vol. 538, Oct. 27, 2016, pp. 471-476.

Zagoruyko; Komodakis: "Paying More Attention to Attention: Improving the Performance of Convolutional Neural Networks via Attention Transfer", Published as a conference paper at ICLR, Feb. 12, 2017.

Tschorsch; Scheuermann: "Bitcoin and Beyond: A Technical Survey on Decentralized Digital Currencies", IEEE Communications survey & Tutorials, Nov. 24, 2017, pp. 2084-2123.

Nikhil Buduma; Nicholas Lacascio: "Fundamentals of Deep Learning, Designing Next-Generation Machine Intelligence Algorithms" Jun. 2017.

Sugano, Y., & Bulling, A. (Aug. 18, 2016). Seeing with humans: Gaze-assisted neural image captioning. arXiv preprint arXiv:1608.05203.

Fong, R. C., Scheirer, W. J., & Cox, D. D. (Mar. 29, 2018). Using human brain activity to guide machine learning. Scientific reports, 8(1), 5397.

Krishnan, V., & Ramanan, D. (Aug. 2016). Tinkering under the hood: Interactive zero-shot learning with net surgery. arXiv preprint arXiv:1612.04901.

Zagoruyko, S., & Komodakis, N. (Feb. 12, 2016). Paying more attention to attention: Improving the performance of convolutional neural networks via attention transfer. arXiv preprint arXiv:1612.03928.

Graves, A., Wayne, G., Reynolds, M., Harley, T., Danihelka, I., Grabska-Barwińska, A., . . . & Badia, A. P. (2016). Hybrid computing using a neural network with dynamic external memory. Nature, 538(7626), 471.

Tschorsch, F. & Scheuermann, B., Bitcoin and Beyond: A Technical Survey on Decentralized Digital Currencies, IEEE Communications Surveys & Tutorials 2084-2123, Nov. 24, 2017.

* cited by examiner

DEEP NEURAL NETWORK TRAINING FOR APPLICATION PROGRAM GENERATION

FIELD

The embodiments discussed herein are related to deep neural network training for application program generation.

BACKGROUND

Human machine interaction, machine learning, and deep learning are increasingly becoming important for digitization and automatization of tasks. Additionally, increases in use of robotics, parallel computing, and the proliferation of powerful edge computing capability have created technical challenges related to implementation of machine learning for complex, nuanced tasks. For instance, the deep neural network training, which may be suitable for these nuanced tasks, generally involves high levels of computing resources. Moreover, an amount of computing resources involved in deep neural network training increases as complexity of sensor input increases.

The subject matter claimed herein is not limited to embodiments that solve any disadvantages or that operate only in environments such as those described. Rather, this background is only provided to illustrate one example technology area where some embodiments described herein may be practiced.

SUMMARY

According to an embodiment, a computer system architecture that may be configured for deep neural network training. The computer system architecture may comprise a processor, a memory, and a differential memory subsystem. The memory includes random access memory (RAM) on which a learning engine may be stored. The learning engine may be configured to present data to an expert user and to receive user sensory input via one or more sensors measuring feedback and reactions of the expert user related to the presented data as the data is presented to the expert user and create an attention map based on the user sensory input. The attention map may be indicative of the portions of the presented data on which the expert user focused and may include one or more data classification regions. The learning engine may be configured to annotate the attention map with the natural language input labels based on a natural language input of the expert user and to train a neural network based on the user sensory input. The learning engine may be configured to create a model based on the trained neural network that is optimized for an anomalous activity of an end use application, to provide an application program for an output target of the end use application; and to instruct the output target via the application program to detect and remedy the anomalous activity. The differential memory subsystem may be physically separate from and networked to the memory and the processor. The differential memory subsystem may be configured to receive neural network information and processed user sensory input from the learning engine for experimental data processing functions.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF SOME EXAMPLE EMBODIMENTS

Figure 1:
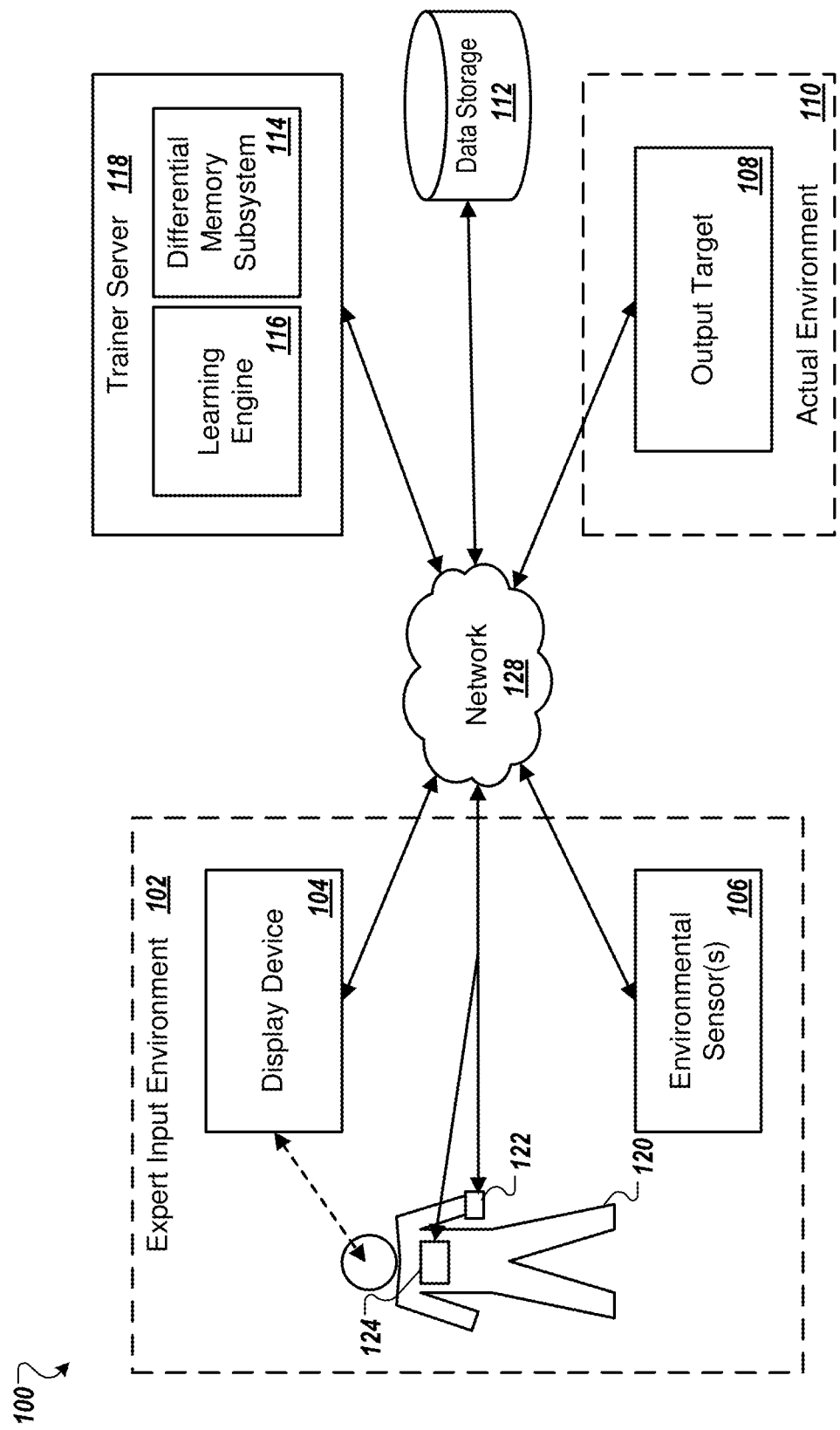
FIG. 1 illustrates an example environment in which deep neural network training for application program generation may be implemented.

In conventional neural network systems, input may be obtained that is used to train a neural network. Typically the input is limited to specific data sets that show inputs and outputs from a variety of circumstances. Training the neural networks may be computationally expensive. The use of computation resources may increase as the amount and/or complexity of input to the neural network increases. Deep learning generally involves even higher levels of computing resources.

The embodiments discussed in the present disclosure are related to deep neural network training for application program generation. In some embodiments, the neural network may be trained based on input of expert users. In particular, in these embodiments, sensors such as gaze sensors, etc., may be implemented to capture subtle, natural responses of the expert users as data is presented to them. In addition, other sensors may be implemented to capture natural language comments or natural text inputs, which may be associated with the information obtained by the sensors measuring the natural responses of the expert user. The use of the data representative of the expert user's natural response to the data is an improvement to conventional systems. In particular, the use of data may provide a deeper refinement of anomalous activity in an actual environment and remedies to the anomalous activity. These anomalous activities and the remedies may be otherwise missed through training based on data sets including inputs and outputs.

The trained neural network may be used to generate an application program. The application program may be generated for a specific output target. The application program may instruct the output target to identify the anomalous activity and implement the remedy consistent with the natural responses of the expert user.

In some embodiments, the training of the neural network may be performed at least partially by a differential memory subsystem. The differential memory subsystem may be separate from other portions of a primary memory used in the neural network training. The differential memory subsystem may perform experimental portions of the training, which may reduce the computational expenditures of the primary memory. Use of the differential memory subsystem may improve generation of the application program and the operation of a server performing the training. For example, the differential memory subsystem may be allocated a portion of processing or computing overhead that may be conventionally performed by the primary memory. Accordingly, the use of the differential memory subsystem may improve the speed at which the application program is generated and may improve the operation (e.g., improve speed, improve accuracy, improve processing resource allocation, and the like) of the system having the primary memory.

These and other embodiments are described with reference to the appended Figures in which like item number indicates like function and/or structure unless described otherwise.

FIG. 1 illustrates an example environment 100 in which deep neural network training for application program generation may be implemented. The neural network training and the application program generation may be performed by a learning engine 116 of a trainer server 118. The learning engine 116 may be configured to receive user sensory input from an expert user 120 as data is displayed on a display device 104. For instance, user sensors 122 and 124 and/or environmental sensors 106 (collectively, sensors 106/122/124) may be configured to measure responses and/or actions of the expert user 120 as the data is presented on the display device 104. Based on the user sensory input, a model may be created or modified for operation of an output target 108 in an actual environment 110 that is representative of the presented data.

From the model, the learning engine 116 may generate an application program. The application program may control operation of the output target 108 in the actual environment 110. For example, the application program may be configured to control operation of the output target 108 that enables the output target 108 to identify and/or address the anomalous activity in the actual environment 110.

The model and the application program generation in the environment 100 may improve conventional model training and conventional application program generation. For example, in the environment 100, the user sensory input may be obtained from the expert user 120 as data is presented on the display device 104. The user sensory input may be related to what the expert user 120 focuses on during presentation of the data and/or comments made by the expert user 120. The learning engine 116 may generate an attention map based on where the expert user 120 focuses and then annotate the attention map with the comments of the expert user 120. The attention map and/or the annotations may be used to classify the user sensory input, which may be used in training a neural network. For instance, classification of input performed by the learning engine 116 may be similar to the classification processes performed in U.S. Pat. No. 9,324,022 or 9,697,444, which are incorporated herein by reference in their entireties. Additionally, an annotated attention map may be used as an input to train a neural network.

The expert user 120 may include an individual who is particularly skilled in the actual environment 110 and/or with use of the output target 108. The expert user 120 may change based on the actual environment 110. For instance, the environment 100 may include a security/counterterrorism environment. The expert user 120 may include a security expert who observes a video feed.

Moreover, in the depicted embodiment, the learning engine 116 may be implemented with a differential memory subsystem (DMS) 114. The DMS 114 may be separate from the learning engine 116 in the trainer server 118. The learning engine 116 may interface with the DMS 114 and may use the DMS 114 for experimental data processing functions. For instance, the learning engine 116 may communicate neural network information and processed user sensory input to the DMS 114. The DMS 114 may also be configured to access the user sensory input and neural network information independently.

The DMS 114 may apply one or more experimental data processing functions based on the received neural network information and processed user sensory input. The DMS 114 may essentially act as a separate computer in the trainer server 118. The DMS 114 may process user sensory input as an alternative computational structure that is suited to perform processes involved in neural network training. Some additional details of the DMS 114 may be found in Graves et al., HYBRID COMPUTING USING A NEURAL NETWORK WITH DYNAMIC EXTERNAL MEMORY, *Nature* 538, 471-476 (27 Oct. 2016), which is incorporated herein by reference in its entirety.

Use of the DMS 114 may improve generation of the application program and the operation of the trainer server 118. For example, the DMS 114 may be allocated a portion of processing or computing overhead that may be conventionally performed by the learning engine 116. Accordingly, the use of the DMS 114 may improve the speed at which the application program is generated and may improve the operation (e.g., improve speed, improve accuracy, improve processing resource allocation, and the like) of the trainer server 118 during the application program generation. Although the environment 100 includes the DMS 114, some embodiments omit the DMS 114. In these embodiments, the learning engine 116 may operate substantially as provided elsewhere in the present embodiment.

The environment 100 may include one or more components such as the trainer server 118, the output target 108, environmental sensors 106, a data storage device 112, user sensors 122 and 124, and the display device 104. The components may be configured to communicate data and information via a network 128. The user sensors 122 and 124 may be implemented on the expert user 120 in an expert input environment 102. The output target 108 may be implemented in an actual environment 110. Each of the components (e.g., 118, 108, 106, 112, 122, 124, 104, etc.) in the environment 100 are described in the following paragraphs.

The network 128 may include any network configured for communication of signals, data, and information between the components of the environment 100. For instance, the network 128 may include a local area network (LAN), a wide area network (WAN) (e.g., the Internet), and/or other interconnected data paths across which multiple devices may communicate. In some embodiments, the network 128 may include a peer-to-peer network. The network 128 may also be coupled to or include portions of a telecommunications network that may enable communication of data in a variety of different communication protocols. In some embodiments, the network 128 includes or is configured to include a BLUETOOTH® communication network, a Wi-Fi communication network, a ZigBee communication network, an extensible messaging and presence protocol (XMPP) communication network, a cellular communications network, any similar communication networks, or any combination thereof for sending and receiving data. The data communicated in the network 128 may include data communicated via short messaging service (SMS), multimedia messaging service (MMS), hypertext transfer protocol (HTTP), direct data connection, wireless application protocol (WAP), e-mail, or any other protocol that may be implemented in the environment 100. In some embodiments, the network 128 may include a simple wired connection between two or more of the components of the environment 100. For example, the display device 104 may be wired to the environmental sensors 106.

In the expert input environment 102, the expert user 120 may be situated relative to the display device 104. The expert user 120 may be authenticated. For example, the expert user 120 may provide login information, a session token, a biometric sample, etc., that may be used to authenticate the expert user 120. In some embodiments, the information provided by the expert user may be stored in a ledger such as a blockchain-style ledger.

The expert user 120 may be fitted with the user sensors 124 and 122. Additionally or alternatively, the environmental sensors 106 may be positioned to enable observation and measurement of the expert user 120 and/or an environmental condition indicative of a response or reaction of the expert user 120. Data may be presented to the expert user on the display device 104. For example, the data may include image data captured from a particular camera, video information captured from a camera, a layout of an agricultural field, a learning user interface, a factory floor layout, video from a monitored area (for security or other purposes), a video game or image for clinical trials or cognitive evaluation, a medical scan (e.g., MRI, X-ray. etc.), equipment movement video images, other data, or combinations thereof. The data communicated to the display device 104 is related to the actual environment 110. For example, the data may be presented on the display device 104 may be actual data obtained at the actual environment 110 or derivatives thereof.

The data presented to the expert user 120 may provide a scenario in the actual environment 110. The reaction and response of the expert user 120 to such scenario may be monitored by the sensors 106/122/124 as the data is presented. The sensors 106/122/124 may produce user sensory input, which may be communicated to the trainer server 118 and/or communicated to the data storage device 112 via the network 128.

The sensors 106/122/124 may be selected to obtain user sensory input that is as natural as possible. For instance, the sensors 106/122/124 may be configured to obtain natural language input, touch input, gaze input, and other sensory input such as an EEG measuring brain activity during presentation of the data on the display device 104. The user sensory input may be representative of an intuition or specific intelligence profile of the expert user 120.

The trainer server 118 may include a computer-based or a hardware-based computing system that is configured for the application program generation and the deep neural network training. The trainer server 118 may be configured to communicate with one or more of the components of the environment 100 via the network 128. The trainer server 118 may include the learning engine 116.

The learning engine 116 and one or more components or modules thereof described throughout the present disclosure may be implemented using hardware including a processor, a microprocessor (e.g., to perform or control performance of one or more operations), a field-programmable gate array (FPGA), or an application-specific integrated circuit (ASIC). In some other instances, the learning engine 116 or modules thereof may be implemented using a combination of hardware and software. Implementation in software may include rapid activation and deactivation of one or more transistors or transistor elements such as may be included in hardware of a computing system (e.g., the trainer server 118). Additionally, software defined instructions may operate on information within transistor elements. Implementation of software instructions may at least temporarily reconfigure electronic pathways and transform computing hardware.

The learning engine 116 may be configured to present the data to the expert user 120. For instance, the learning engine 116 may communicate the data to the display device 104 via the network 128. As the data is presented to the expert user, the learning engine 116 may receive the user sensory input. For instance, the sensors 106/122/124 may be configured to capture user sensory input based on measured feedback and reactions of the expert user 120 related to the presented data.

The learning engine 116 may be configured to create an attention map. The attention map may be based on the user sensory input and may be configured to indicate portions of the presented data on which the expert user 120 focused.

In some embodiments, the learning engine 116 may perform an attention transfer process. The attention transfer process may include a gradient-based attention transfer or an activation-based attention transfer. In some embodiments, the learning engine 116 may perform an attention transfer process as described in Zagoruyko & Komodakis, Paying More Attention to Attention: Improving the Performance of Convolutional Neural Networks via Attention Transfer, published as a conference paper at ICLR 2017, Feb. 12, 2017, available at https://arxiv.org/pdf/1612.03928.pdf, which is incorporated herein by reference in its entirety.

Additionally, the attention map may include one or more data classification regions. The learning engine 116 may annotate the attention map with the natural language input labels based on a natural language input of the expert user 120. The learning engine 116 may train a neural network based on the user sensory input and the annotated attention map. For instance, the annotated attention map may be included as an input to the neural network. The learning engine 116 may create and/or modify a model based on the trained neural network. The learning engine 116 may further optimize the neural network for an end use application, which may be implemented by the output target 108. In particular, the learning engine 116 may optimize the neural network for an anomalous activity of the end use application, which may be implemented by the output target 108. The learning engine 116 may provide an application program for the output target 108 of the end use application. The learning engine 116 may instruct the output target 108 via the application program to detect and remedy the anomalous activity in the actual environment 110.

The trainer server 118 may include the DMS 114. The DMS 114 may be a portion of memory that is physically separate from the learning engine 116. The DMS 114 may be configured for experimental data processing functions associated with the training of the neural network. In some embodiments, the learning engine 116 may be configured to communicate to the DMS 114 neural network information and processed user sensory input. The DMS 114 may use received neural network information and processed user sensory input for the experimental data processing functions. In some embodiments, the DMS 114 may employ operations to mimic a neural Turing machine for the experimental data processing functions.

The output target 108 may include a device that is implemented in the actual environment 110. The output target 108 may be configured to receive the application program from the learning engine 116. The output target 108 may operate similarly to the expert user 120. For instance, the user sensory input is based on the responses and interactions of the expert user 120 responses to data that simulates or is derivative of the actual environment. The application program is based on the user sensory input. Accordingly, the output target 108 may perform actions that are similar to the actions the expert user 120 performed in the expert input environment 102. For example, the application program may enable detection or identification of anomalous activity in the actual environment 110 that is similar or identical to an anomalous activity in data presented via the display device 104. The application program may further include a remedy or a way to address the identified anomalous activity, which may be similar to a remedy implemented by the expert user 120 or a way the expert user 120 addressed the anomalous activity.

The data storage device 112 may be implemented in the environment 100. The data storage device 112 may be configured to data and information in the environment. For instance, the data storage device 112 may store raw user sensory input, trained neural networks, optimized models, application programs, attention maps, annotations based on natural language input, sensor input data, or some combination thereof. The data storage device 112 may include a non-transitory medium similar to memory 910 described below. In some embodiments at least some portion of the data stored in the data storage device 112 may be uniquely tagged such that the data is explicitly related to a specific session and/or a specific expert user (e.g., 120). For instance, a particular set of sensor input data provided by a particular expert user that is provided during a particular input session. The set of sensor input data may be uniquely tagged (e.g., with the expert user login, time, date, etc.) such that the particular set of sensor input data is explicitly related to the particular expert user and the particular input session.

The environment 100 is described in a generic sense. The environment 100 and principles thereof may be applicable in multiple test cases. For example, the environment 100 may include a security/counterterrorism environment. In this example, the expert user 120 may include a security expert. The expert user 120 may observe a video feed. The learning engine 116 may create an attention map using gaze or other input devices based on what observations and anomalies the expert user 120 may find suspicious. The expert user 120 may also input observations in natural language, and create an expert system profile to be deployed to smart edge devices to look for specific anomalous activity.

The environment 100 may include an agricultural environment. The expert user 120 may include a farmer, a botanist, or a greenhouse specialist, for instance. The expert user 120 may observe footage (drone camera, thermal, satellite, ground sensor data feed) and the attention map may be used to create flight paths, areas of interest, and other annotations for the expert system to train to increase yield, and help eliminate crop failure.

The environment 100 may include a factory environment. In this example, the expert user 120 may include a highly skilled maintenance or factory workers. The expert user 120 may observe a drone, a camera, or data from a factory and add expert analysis. For example, the expert user 120 may observe an unsafe practice or anomalous activity that may benefit from attention. The expert trained system can later transfer this learning to edge devices.

The environment 100 may include a behavior/cognitive health environment. In this example environment, the expert user 120 may also observe behavioral characteristics of patients with cognitive or developmental disabilities. Such observation may be achieved by the attention maps created by mapping gaze and by observing the physical and emotional reaction to how a subject is reacting to a video game, or video, image, or sound.

The environment 100 may include a medical imaging environment. In this example environment, the expert user 120 may be a doctor who may look at MRI scans looking for a specific tumor or disorder. Based on gaze data or touch input, attention to a specific part of an image may be detected. Attention maps and anomalous activity detection may be implemented to medical imaging devices.

The environment 100 may include a firefighting/disaster recovery environment. In this example environment, the expert user 120 may include a firefighter who may train intelligent agents from a video feed of a fire, or disaster area. The expert user 120 may inform what or where help is most needed. The output target 108 may include deployed drones or cameras that may be alerted based on an application program.

The environment 100 may include a robotic movement environment. In this example environment, the expert user 120 may include a robotics expert or an engineer. The expert user 120 may observe a machine equipped with motion sensors, and/or under observation by an RBGd camera, which may be used to create a movement profile and train a robotic version of the expert user 120 or machine.

The environment 100 may include a cognitive/learning behavior environment. In this example environment, the expert user 120 may include a teacher that trains the system for particular focus areas on learning materials. A student may then use the system and the gaze of the student may be compared with the focus areas of the teacher to determine whether the student is focused on the proper portions of the data.

Modifications, additions, or omissions may be made to the environment 100 without departing from the scope of the present disclosure. For example, the environment 100 may include one or more of the display devices 104, one or more of the sensors 106/122/124, one or more of the trainer servers 118, one or more data storage devices 112, one or more of the output targets 108, or any combination thereof. Moreover, the separation of various components and servers in the embodiments described herein is not meant to indicate that the separation occurs in all embodiments. For example, in some embodiments, the data storage devices 112 may be included in the trainer server 118. Moreover, it may be understood with the benefit of this disclosure that the described components and servers may generally be integrated together in a single component or server or separated into multiple components or servers. For example, the DMS 114 may be implemented in another computing device that is communicatively coupled to the trainer server 118.

Figure 2:
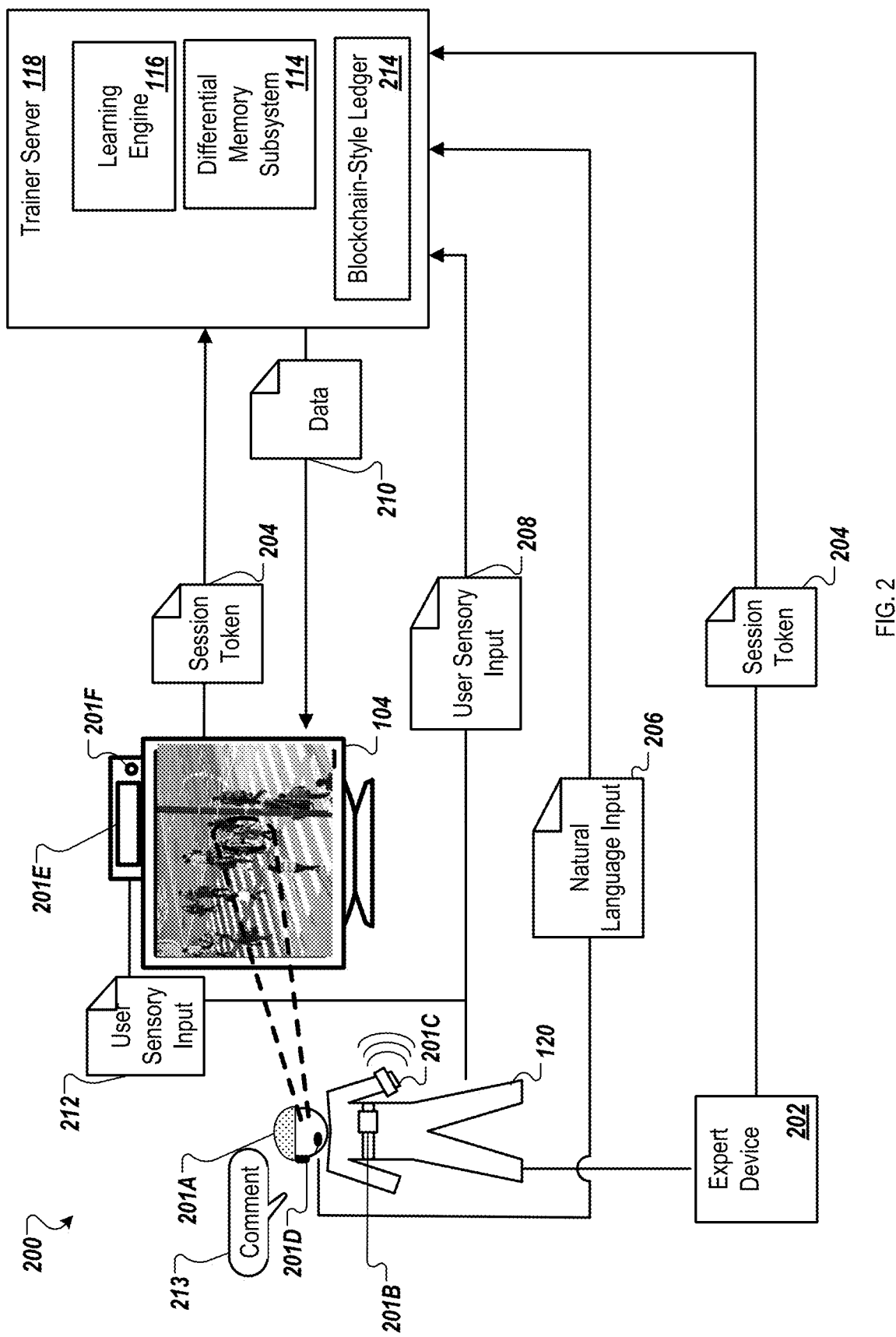
FIG. 2 illustrates an example user sensory input acquisition process, that may be implemented in the environment of FIG. 1.

FIG. 2 illustrates an example user sensory input acquisition process (acquisition process) 200, that may be implemented in the environment 100 of FIG. 1. For example, the acquisition process 200 may be implemented in the expert input environment 102 of FIG. 1. FIG. 2 may include the expert user 120 and the trainer server 118 described with reference to FIG. 1. FIG. 2 omits a communication network. However, it may be understood with the benefit of this disclosure that the communication of information (e.g., 204, 206, 208, 210, and 212) may be communicated by a communication network such as the network 128 of FIG. 1.

In the expert user 120 may be authenticated. For example, the expert user 120 may communicate a session token 204 to the trainer server 118. The session token 204 may identify the expert user as a particular user who interfaces with the trainer server 118 and/or identifies a particular period of time (e.g., a session) during which the expert user 120 provides user sensory input 208 and 212 to the trainer server 118.

In the some embodiments, the expert user 120 may communicate the session token 204 via the display device 104. In other embodiments, the expert user 120 may interface with an expert device 202 to communicate the session token 204 to the trainer server 118. Additionally, the expert user 120 may be configured to provide login information to the trainer server 118 using a password, a biometric sample, or another suitable identifier.

The session token 204 as well as the user sensory input 208 and 212 among other data may be stored in a blockchain-style ledger 214. The blockchain-style ledger 214 may include a list of cryptographically secured records that may include a timestamp and other data. In some embodiments, the blockchain-style ledger 214 may be similar to the blockchain described in Tschorsch & Scheuermann, Bitcoin and Beyond: A Technical Survey on Decentralized Digital Currencies, IEEE Communications Surveys & Tutorials 2084-2123, 24 Nov. 2017, which is incorporated herein by reference in its entirety. In other embodiments, the session token 204 and/or the user sensory input 208 and 212 may be stored in another suitable format or database.

The trainer server 118 may be configured to communicate data 210 to the display device 104. In some embodiments, a source of the data 210 may be selected by the expert user 120 using the display device 104. For instance, the expert user 120 may be presented multiple sources of the data 210 on the display device 104. The expert user 120 may then select one of the presented sources. For instance, the expert user 120 may select a data source that includes a street camera from a particular intersection. The trainer server 118 may then route the video data from the street camera to the display device 104. The data 210 may be displayed on the display device 104. For example, in FIG. 2, an image or a video of an intersection is displayed on the display device 104. Some additional details of example selections are provided with reference to FIG. 5.

The expert user 120 may be fit with and/or observed by multiple sensors 201A, 201B, 201C, 201D, 201E, and 201F, which may be substantially similar to and may correspond to the sensors 106/122/124. The multiple sensors 201A, 201B, 201C, 201D, 201E, and 201F may be generally referred to as a sensor 201 or sensors 201. For example, in the depicted embodiment, the expert user 120 may be fit with an electroencephalogram (EEG) 201A, a heart rate monitor 201B, an accelerometer 201C, and a microphone 201D. In addition, a gaze camera 201E and a gesture capture camera 201F may be implemented to observe the expert user 120. In other embodiments other sensors 201 may be implemented to observe and monitor the expert user 120. For instance in some embodiments, the sensors 201 may include an RBGd (depth) camera, a gesture capture sensor, a biometric capture system, a wearable sensor system, digital I/O interface, wearable ring type input, a keyboard, a mouse, an emotion recognition system, a gaze tracking system, a video interface, a microphone, a brain computer interface, a haptic interface, a wireless receiver, a high resolution camera, a thermal or infrared camera, a light sensor, a global positioning system (GPS), a wireless transmitter, a three-hundred and sixty degree camera, a digital optical interface, a virtual reality interface, or some combination thereof.

The sensors 201 may be configured to generate user sensory input 208 and 212. The user sensory inputs 208 and 212 may be communicated to the trainer server 118. The user sensory input 208 may include multiple types of input generated from one or more of each of the sensors 201. For instance, a first user sensory input 212 may be generated by the gaze camera 201E. The gaze camera 201E may determine where on the display device 104 is looking as the data 210 is displayed to the expert user 120. Accordingly, the first user sensory input 212 may include a representation of the data 210 with an indication of where the expert user 120 looks. A second user sensory input 208 may be generated by the EEG 201A. Accordingly, the second user sensory input 208 may be representative of data generated by the EEG 201.

The user sensory input 208 and 212 may be generated and communicated as the data 210 is displayed on the display device 104. The user sensory input 208 and 212 may be stored along with a timestamp such that the user sensory input 208 and 212 is associated with a particular portion of the data 210 displayed at a particular time.

In addition to the user sensory input 208 and 212, natural language input 206 may be communicated to the trainer server 118. The natural language input 206 may be representative of a comment 213 or another similar input (e.g., a touch, a typed input, a mouse click, etc.) that is provided by the expert user 120. The comment 213 may be provided in a natural spoken or written language and may narrate the response or action of the expert user 120 as the user sensory input 208 and 212 is obtained. The natural language input 206 may be stored or processed with the user sensory input 208 and 212 to provide an input to the neural network trained by the learning engine 116.

Figure 3:
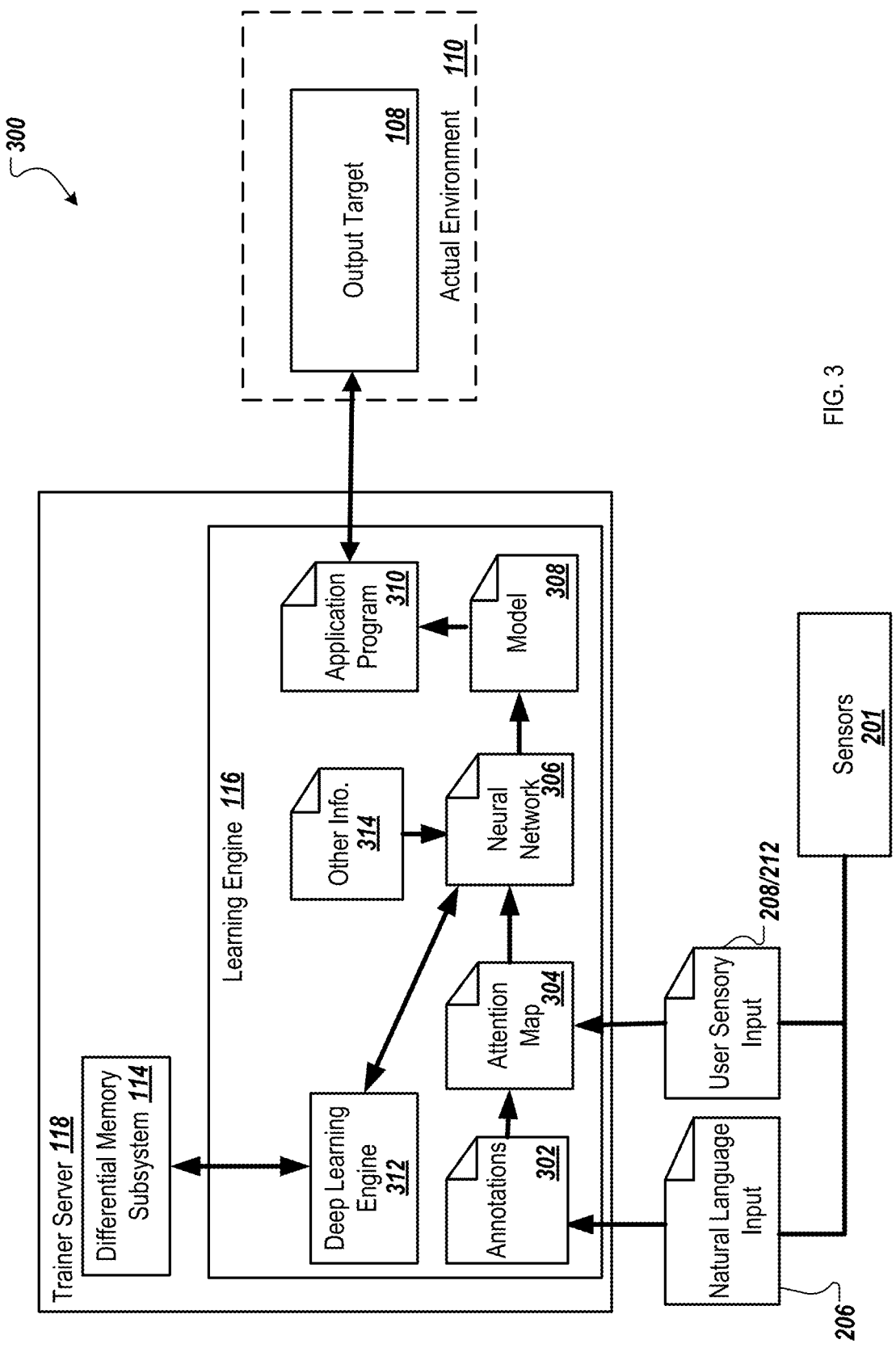
FIG. 3 illustrates an example application program generation process that may be implemented in the environment of FIG. 1.

FIG. 3 illustrates an example application program generation process (generation process) 300 that may be implemented in the environment 100 of FIG. 1. For example, the generation process 300 may be implemented by the trainer server 118 of FIG. 1. FIG. 3 may include the trainer server 118 and the output target 108, which may be included in the actual environment 110 as described with reference to FIG. 1. FIG. 3 omits a communication network. However, it may be understood with the benefit of this disclosure that the communication of information (e.g., 206, 208, 212, and 310) may be communicated by a communication network such as the network 128 of FIG. 1.

In the generation process 300, the trainer server 118 may be configured to receive the natural language input 206 and the user sensory input 208/212 from the sensors 201 as described with reference to FIG. 2. The natural language input 206 may correspond to and be associated with the user sensory input 208/212. For example, the natural language input 206 may be comments that are concurrently received with user sensory input 208/212 that measure feedback and reactions of the expert user (e.g., the expert user 120 of FIGS. 1 and 2).

The learning engine 116 may create an attention map 304 based at least partially on the user sensory input 208/212. The attention map 304 may be indicative of the portions of the presented data on which the expert user focused. The attention map 304 may include one or more classification regions. In addition, the learning engine 116 may generate one or more annotations 302 from the natural language input 206. The annotations 302 may be added to the attention map 304. For example, the learning engine 116 may annotate the attention map 304 with the natural language input labels based on the natural language input 206 of the expert user.

The learning engine 116 may train a neural network 306. The learning engine 116 may train the neural network 306 based on the user sensory input 208/212, the natural language input 206, the annotations 302, the attention map 304, other information 314 (in FIG. 3 other info. 314), or some combination thereof. The other information 314 may include application instructions and source codes related to the output target 108, product specifications related to the output target 108, device specification of the output target 108, or physical constraints of the actual environment 110. For instance, the attention map 304 with the annotations 302 may be used as an input to the neural network 306 along with the other information 314. Training the neural network 306 may isolate or refine a particular set of inputs that are indicative of an anomalous activity in the actual environment 110. Additionally, the training of the neural network 306 may isolate or refine a remedy or an operation for the output target 108 that addresses the anomalous activity in the actual environment 110.

The trained neural network 306 may be optimized for an anomalous activity of an end use application. For instance, the neural network 306 may be trained for the detection of a particular anomalous activity or set of anomalous activity in the actual environment 110. For instance, in some embodiments the actual environment 110 may include an agricultural environment. In these embodiments, the expert user includes an agriculture expert. Additionally, the attention map 304 may include a heat map, an image with a grid overlay, or an object segmentation selection. The user sensory input 208/212 may include user gaze data representative of a gaze of the agriculture expert as captured by a gaze sensor and physical touch data representative of a physical touch received on a touch screen. The natural language input 206 of the agriculture expert user may include a voice input or a touch function. The annotations 302 and the attention map 304 may be based on the natural language input 206 and may be used to train the neural network 306. The end use application may include a watering schedule of the agricultural environment. Accordingly, the neural network 306 may be trained to identify anomalous activity (e.g., dry areas, malfunctioning devices, etc.) related to the agricultural environment. The neural network 306 may be further trained to implement a remedy (e.g., increase watering, replace device, etc.) in the agricultural environment using the output target 108. The output target 108 may include a piece of equipment (e.g., a sprinkler) implemented in the actual environment 110 and configured to be directly or indirectly controlled by the learning engine 116.

In addition, in some embodiments, the learning engine 116 may include a deep learning engine 312. The deep learning engine 312 may be configured to help train the neural network 306. The deep learning engine 312 may communicate neural network information and processed user sensory input to the DMS 114. For instance, the deep learning engine 312 may communicate the annotations 302, the attention map 304, the other information 314, etc., to the DMS 114. The DMS 114 may be configured for experimental data processing functions. For instance, the DMS 114 may employ operations to mimic a neural Turing machine for the experimental data processing functions.

The learning engine 116 may create a model 308 and/or modify a model 308 based on the trained neural network 306. For instance, the learning engine 116 may evaluate the user sensory input 208/212, the natural language input 206, the annotations 302, the attention map 304, the other information 314 or some combination thereof to determine whether a new model 308 may be created or the model 308, which already exists, may be modified. In response to such determinations, the model 308 may be created or modified.

The learning engine 116 may provide an application program 310 for the output target 108. The application program 310 may be based on the model 308. The application program 310 may be optimized for the end use application and in particular to identify one or more anomalous activity and one or more remedies to the identified anomalous activity. The application program 310 may be implemented by the output target 108. For instance, the application program 310 may be configured to instruct the output target 108. For example, the application program 310 may instruct the output target 108 to detect and remedy the anomalous activity or anomalous activity in the actual environment 110.

In some embodiments, the learning engine 116 may enable a quality check of the application program. The quality check may occur during a quality check session by a second expert user, who may be different from the expert user 120 described in the present disclosure. For instance, similar to the authentication described with reference to FIG. 2, the quality check may include receiving from a second expert user a second session token. The second expert user may be authenticated based on the second session token. The quality check session of the second expert user may be timestamped. The second expert user may then evaluate whether the application program 310 accurately and effectively identifies anomalous activity and implements remedies such anomalous activity. Any information obtained by the second expert user may be stored on a blockchain-style ledger 214.

Figure 4A:
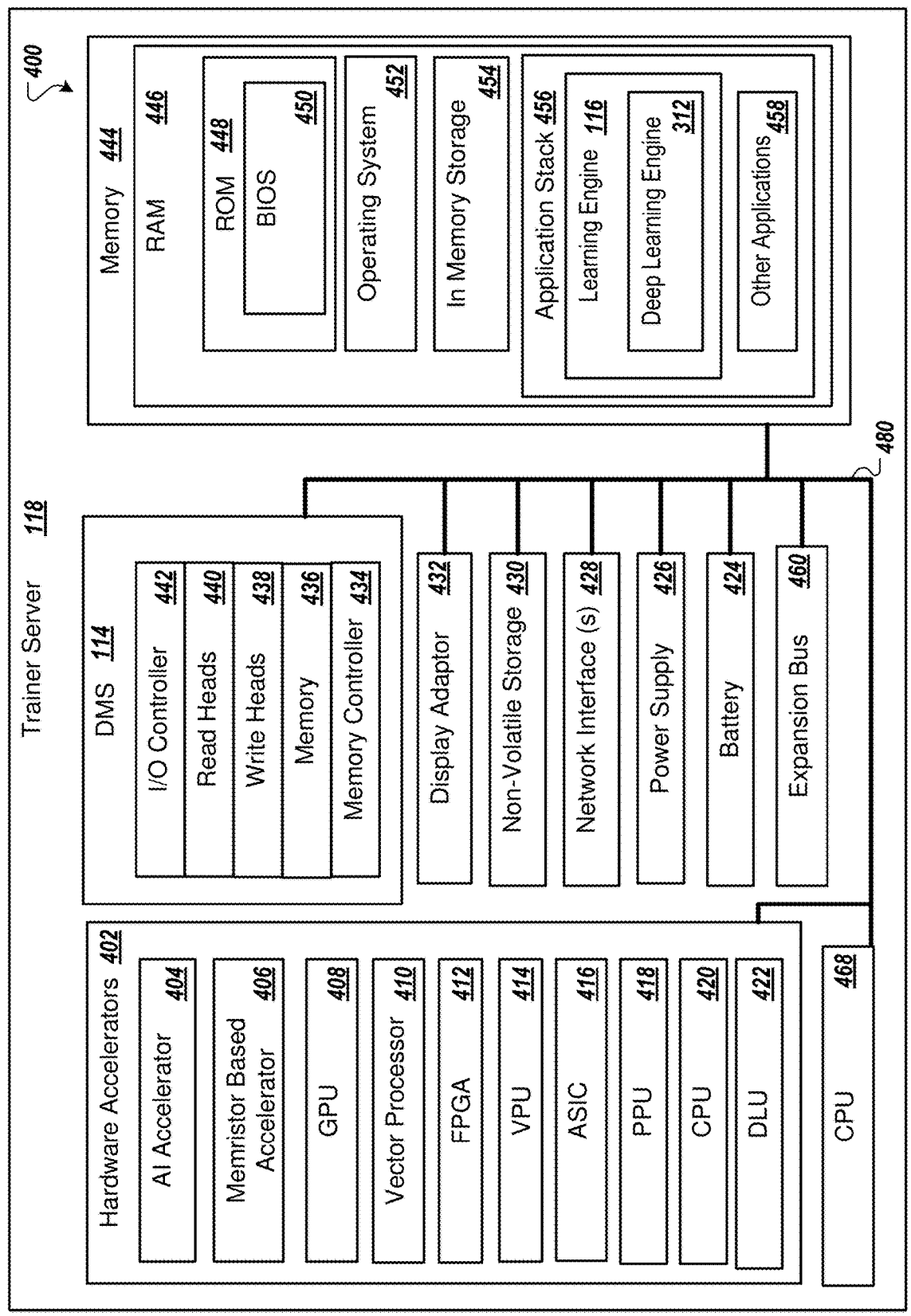
FIGS. 4A and 4B illustrate an example computer architecture of a trainer server that may be implemented in the environment of FIG. 1.
Figure 4B:
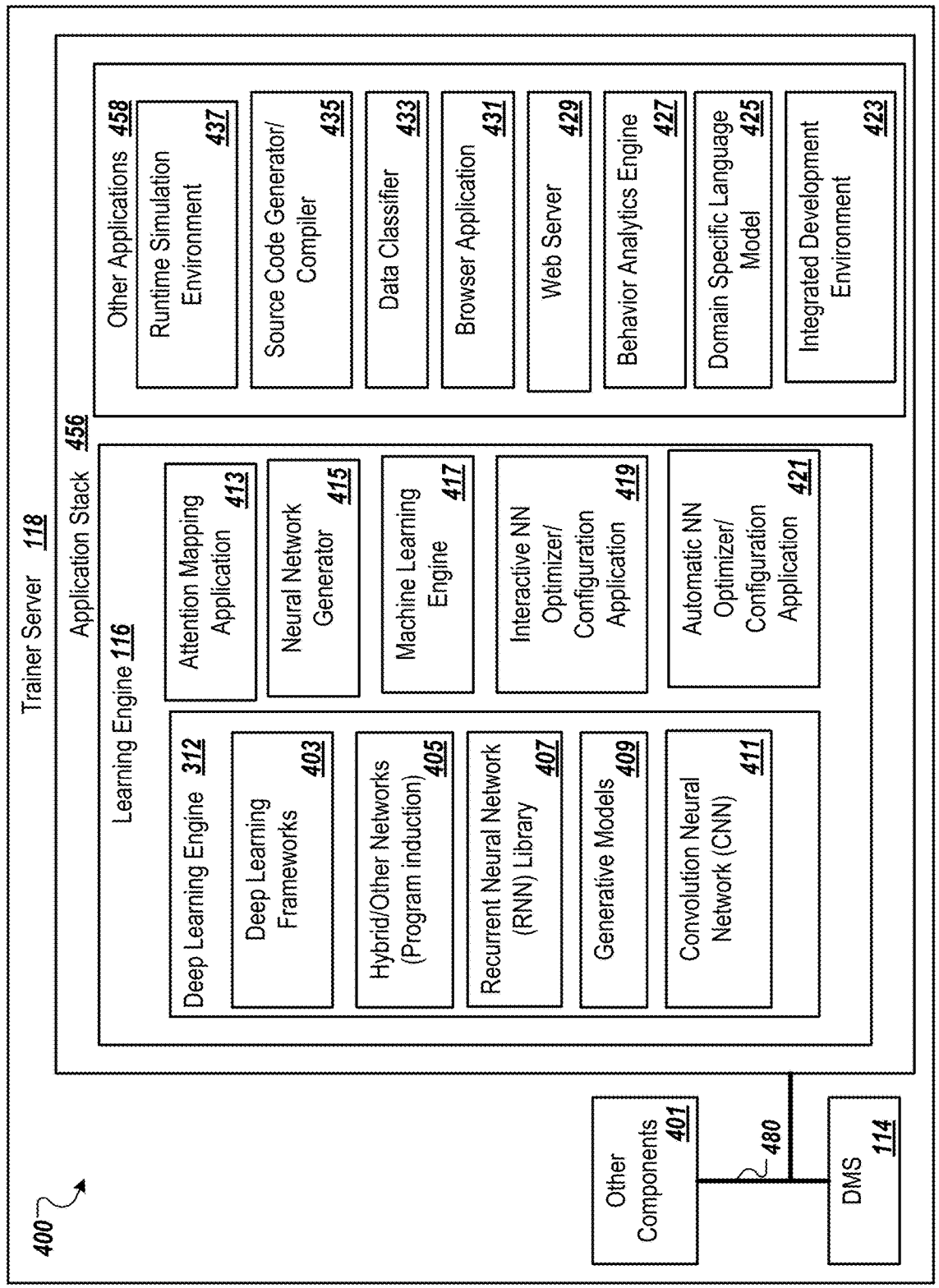

FIGS. 4A and 4B illustrate an example computer architecture 400 of the trainer server 118 described with reference to FIGS. 1-3. FIG. 4A depicts the computer architecture 400 that includes hardware accelerators 402, a central processing unit (CPU) 468, the DMS 114, a display adaptor 432, a non-volatile storage 430, a network interface 428, a power supply 426, a battery 424, an expansion bus 460, and a memory 444, which are connected via a bus 480.

The hardware accelerators 402 may be configured to provide processing capability in the trainer server 118. For instance, the hardware accelerators 402 may process portions of the user sensory input or other data, which may alleviate some processing that may otherwise be performed by the CPU 468. A benefit of the hardware accelerators 402 may include an increase in the speed at which a neural network is trained, a model is created, an application program is generated, or some combination thereof when compared to systems that omit the hardware accelerators 402. In the depicted embodiment, the hardware accelerators 402 may include an artificial intelligence (AI) accelerator 404, a memristor-based accelerator 406, a graphical processing unit (GPU) 408, a vector processor 410, an FPGA 412, a vision processing unit (VPU) 414, an ASIC 416, a physics processing unit (PPU) 418, a general purpose CPU 420, a deep learning unit (DLU) 422, or some combination thereof.

The CPU 468 may communicate data and information with the hardware accelerators 402 for processing of information.

The DMS 114 in FIG. 4A may include an I/O controller 442, read heads 440, write heads 438, memory 436, and a memory controller 434. The DMS 114 may be connected with the bus 480 to communicate with one or more other components of the trainer server 118. In some embodiments, the DMS 114 as well as one or more of the I/O controller 442, the read heads 440, the write heads 438, the memory 436, and the memory controller 434 may operate as described in *Nikhil Buduma and Nicholas Lacascio*, FUNDAMENTALS OF DEEP LEARNING, DESIGNING NEXT-GENERATION MACHINE INTELLIGENCE ALGORITHMS, June 2017, which is incorporated herein by reference in its entirety.

In the depicted embodiment, the DMS 114 may be configured to interface with the deep learning engine 312 to train a neural network. For instance, the deep learning engine 312 may communicate to the DMS 114 neural network information and processed user sensory input. The DMS 114 and the I/O controller 442, the read heads 440, the write heads 438, the memory 436, and the memory controller 434 may perform experimental data processing functions based on the received neural network information and processed user sensory input.

The memory 444 may be substantially similar to memory 910 described with reference to FIG. 9. The memory 444 may include random access memory (RAM) 446. The RAM 446 may further include read only memory (ROM) 448, an operating system 452, in-memory storage 454, and an application stack 456. The RAM 446 of memory 444 may be physically separate from the DMS 114. Additionally, the DMS 114 and the memory 444 may be connected to or networked together. For instance, the DMS 114 and the memory 444 may be connected via the bus 480. The application stack 456 may include the learning engine 116 and one or more other applications 458. The learning engine 116 may include the deep learning engine 312 among other applications and engines.

Referring to FIG. 4B, some additional details of the computer architecture 400. In particular, FIG. 4B includes details of the learning engine 116, the deep learning engine 312, and the other applications 458. FIG. 4B includes other components 401, which may include the hardware accelerators 402, the CPU 468, the display adaptor 432, the non-volatile storage 430, the network interface 428, the power supply 426, the battery 424, the expansion bus 460, or some combination thereof described with reference to FIG. 4A. As described above, the other components 401, the DMS 114, and the application stack 456 may be communicative coupled via the bus 480.

In the depicted embodiment, the other applications 458 may include a runtime simulation environment 437, a source code generator/compiler 435, a data classifier 433, a browser application 431, a web server 429, a behavior analytics engine 427, a domain specific language model 425, an integrated development environment 423, or some combinations thereof. The other applications 458 may provide functions related to processing of the input from an expert user, generation of the application program, communication of the application program to an output target, or some other related functions. For instance, the runtime simulation environment 437 may enable testing of an application program. The source code generator/compiler 435 may provide source code related to an output target (e.g., the output target 108 of FIG. 1).

The learning engine 116 may include one or more applications related to training of neural networks (e.g., 306 of FIG. 3). For example, the learning engine 116 of FIG. 4B may include an attention mapping application 413 to create an attention map, a neural network generator 415, a machine learning engine 417, an interactive neural network optimizer/configuration application 419, an automatic neural network optimizer/configuration application 421, and the deep learning engine 312.

The deep learning engine 312 may be intended to be run in the memory (e.g., 444 of FIG. 4A). For instance, the deep learning engine 312 may include libraries, frameworks, and other neural network models, from multiple virtual machines, which may run simultaneously. The deep learning engine 312 may dynamically share or allocate resources to other components as needed. The deep learning engine 312 may enable multiple models and frameworks to run and evaluate simultaneously until the optimal neural network is found. In the depicted embodiment, the deep learning engine 312 may include deep learning frameworks 403, hybrid/other networks 405, recurrent neural network (RNN) library 407, generative models 409, a convolution neural network (CNN) 411, or some combination thereof.

Figure 5:
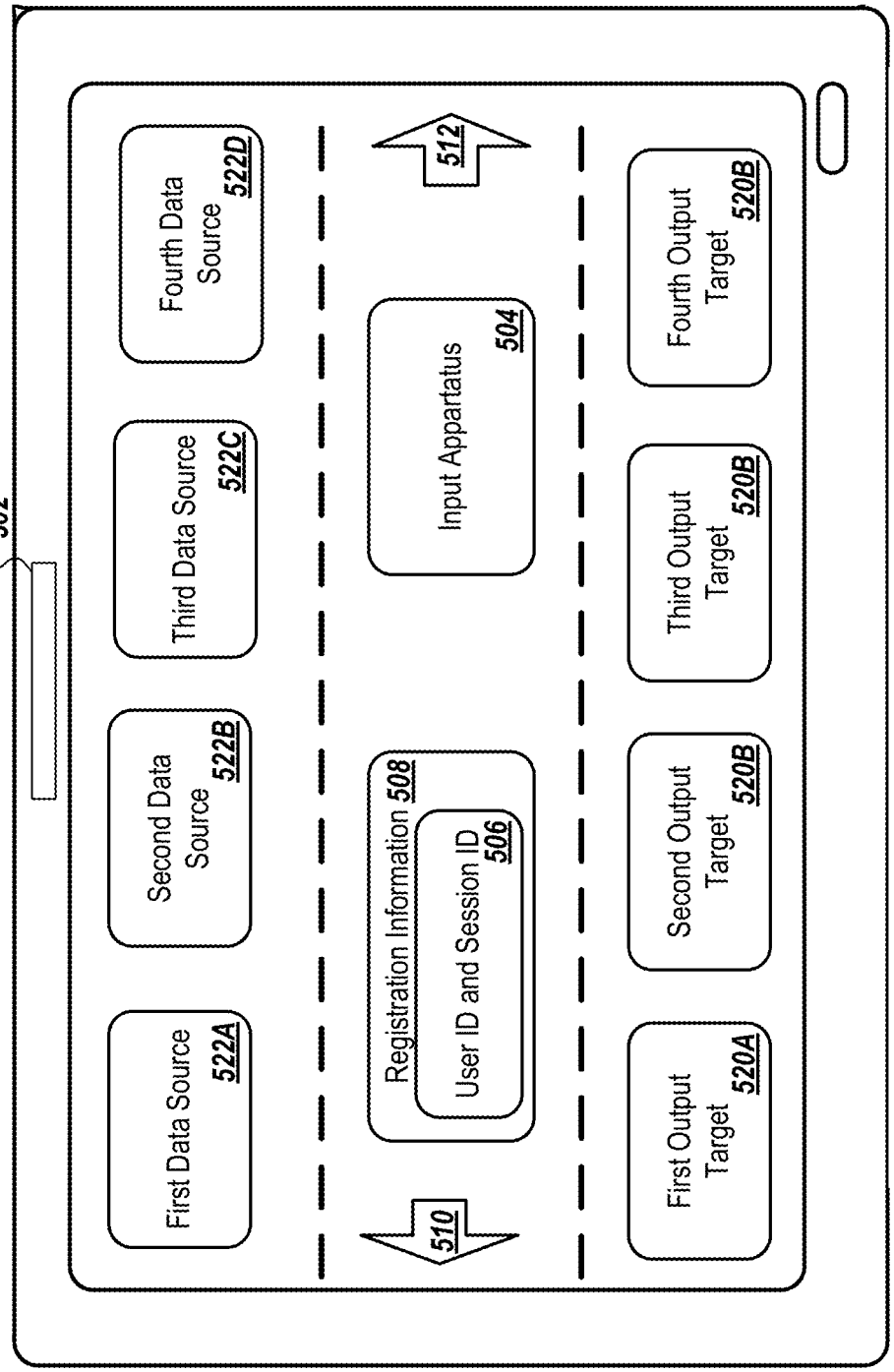
FIG. 5 depicts an example embodiment of a display device that may be implemented in the environment of FIG. 1.

FIG. 5 depicts an example embodiment of the display device 104 of FIG. 1 that is configured to receive user input from an expert user such as the expert user 120 of FIG. 1. The display device 104 may include a screen on which multiple icons (e.g., 522A-522D, 506, 504, 508, 510, 512, and 520A-520D) may be presented. The display device 104 may be configured as a touch screen that may enable selection of one or more of the icons through touching of a screen of the display device 104. In the depicted embodiment, for instance, the display device 104 may enable selection, entry, and confirmation of registration information 508, an input apparatus 504, a data source 522A-522D, an output target 520A-520D, or some combination thereof.

On the display device 104, an upper portion may display one or more data sources 522A-522D (generally, data source 522 or data sources 522). The data sources 522 may include devices and/or systems from which data that is presented to the expert user originates or is accessed. The data sources 522 may be one or more devices in an actual environment such as the actual environment 110 of FIG. 1. For instance, the data sources 522 may include multiple cameras in the actual environment 110, a stationary camera and a drone-mounted camera, two or more other data sources in the actual environment 110, or other suitable data sources.

Using the display device 104 or a device connected to the display device 104, the expert user may select one of the data sources 522 from the data sources 522 presented in the upper portion. After selection of the data source 522, data (e.g., the data 210 of FIG. 2) may be presented on the display device 104. The expert user may interact with display device 104 to provide user sensory input as described elsewhere in the present disclosure. For instance, in the depicted embodiment, the display device 104 may include a gaze detector 502. As the expert user interacts with the display device 104, the gaze detector 502 may observe the expert user and generate the user sensory input based thereon.

For example, in some embodiments, the expert user may be an agriculture expert. In this embodiment, an actual environment may include a field of crops, for instance. The display device 104 may display a first data source 522A that is a first camera at a first location in the field of crops, a second data source 522B may include a drone-mounted video, a third data source 522C may include a satellite image of the field, and a fourth data source 522D may include a thermal image of the field. In other embodiments, the data sources 522 may include other sources such as an image of a greenhouse, a video of an indoor garden, or some other agricultural image/video. The expert user may then select one of the data sources 522. For instance, the expert user may touch the icon corresponding to one of the data sources 522 or use a mouse (or another suitable device) to select the icon corresponding to the data source 522.

On the display device 104, a central portion may display icons related to a registration information 508. The expert user may create a profile on the display device 104 and save the profile using a blockchain-style ledger such as the blockchain-style ledger 214 of FIG. 2. The profile may include registration information 508 provided by the expert user. The registration information 508 may also be entered and accessed using a User ID and Session ID 506. The User ID and Session ID 506 may be logged on using a blockchain-style ledger.

The central portion of the display device 104 may also display an icon related to an input apparatus 504, which may be used to obtain natural language input. For instance, the input apparatus 504 may take in sensory input, reactions, comments, and interactions from the expert user, which may be used to create attention maps based on the interactions and responses of the expert user. The input apparatus may also modify the weights, class information, or annotations, of the deep learning neural network models. The input apparatus may display several input apparatus options. For example, the input apparatuses may include a natural language apparatus such as a touch screen, a gaze detector, and an EEG measuring brain activity during stimulus response. The natural language apparatus may capture the intuition or specific intelligence profile of the expert user, which may be used to create the attention maps or annotations included therein.

For example, in some embodiments, the expert user may be an agriculture expert. The agriculture expert may provide registration information 508 via a User ID and Session ID 506. The agriculture expert may select the input apparatus 504. The agriculture expert may select one or more sensory inputs from the input apparatus 504. For example, the agriculture expert may select a gaze tracker and a voice input. The agriculture expert may have selected a field of crops as a data source 522. The agriculture expert may then utilize the gaze sensor to hone in on a specific area of the field of crops. Using voice input, the agriculture expert may label or annotate data in the data source 522.

On the display device 104, a lower portion may display icons related to one or more output targets 520A-520D (generally, output target 520 or output targets 520). The output targets 520 may receive an application program generated by a learning engine. The application program may include instructions developed based on user sensory input obtained through observation of the expert user. The output targets 520 may be one or more devices operating in an actual environment such as the actual environment 110 of FIG. 1. For instance, the output targets 520 may include multiple cameras in the actual environment 110, a stationary camera and a drone-mounted camera, a smart irrigation system, a drone or camera that is trained to detect similar events, a wearable sensor system, an augmented reality headset, two or more other output targets in the actual environment 110, or other suitable output targets.

Figure 6:
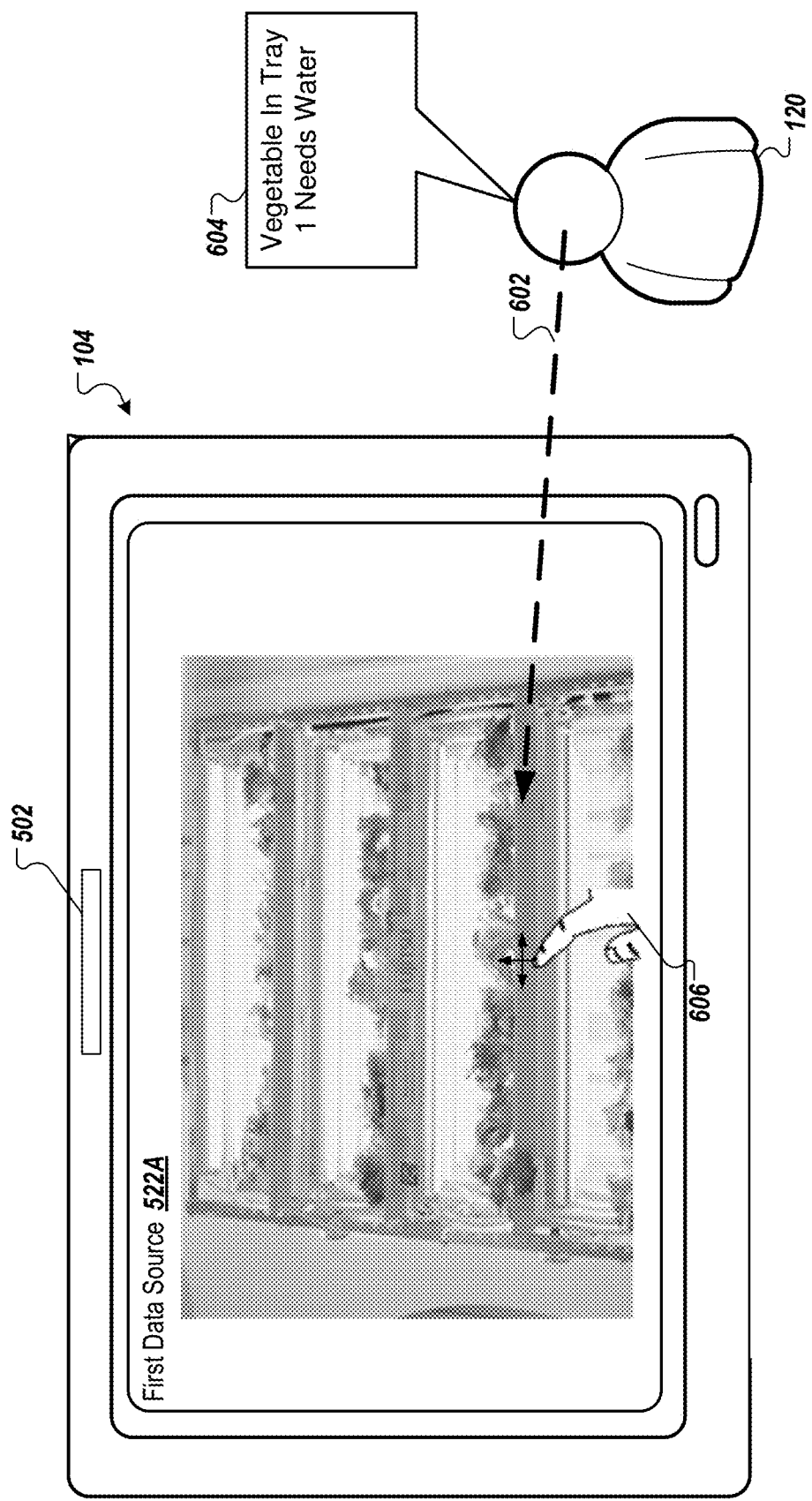
FIG. 6 illustrates the display device of FIG. 5 following selection of a first data source.

FIG. 6 illustrates the display device 104 following selection of the first data source 522A of FIG. 5. Data fed or accessed from the selected first data source 522A may be presented on the display device 104.

As the expert user 120 interfaces with the display device 104, user sensory input may be obtained by one or more sensors implemented to observe the expert user 120. For instance, the display device 104 of FIG. 6 may include the gaze detector 502. The gaze detector 502 may observe a view 602 of the expert user 120 or determine a portion of the first data source 522A on which the expert user 120 focuses. Additionally or alternatively, a microphone, which may also be selected, may obtain a natural language input in the form of a comment 604 spoken by the expert user 120. Additionally still, the display device 104 may obtain user sensory input in the form of a touch 606 of the expert user 120 or another suitable sensor. The natural language input and/or the user sensory input may be communicated to a trainer server (e.g., 116 described herein).

Figure 7:
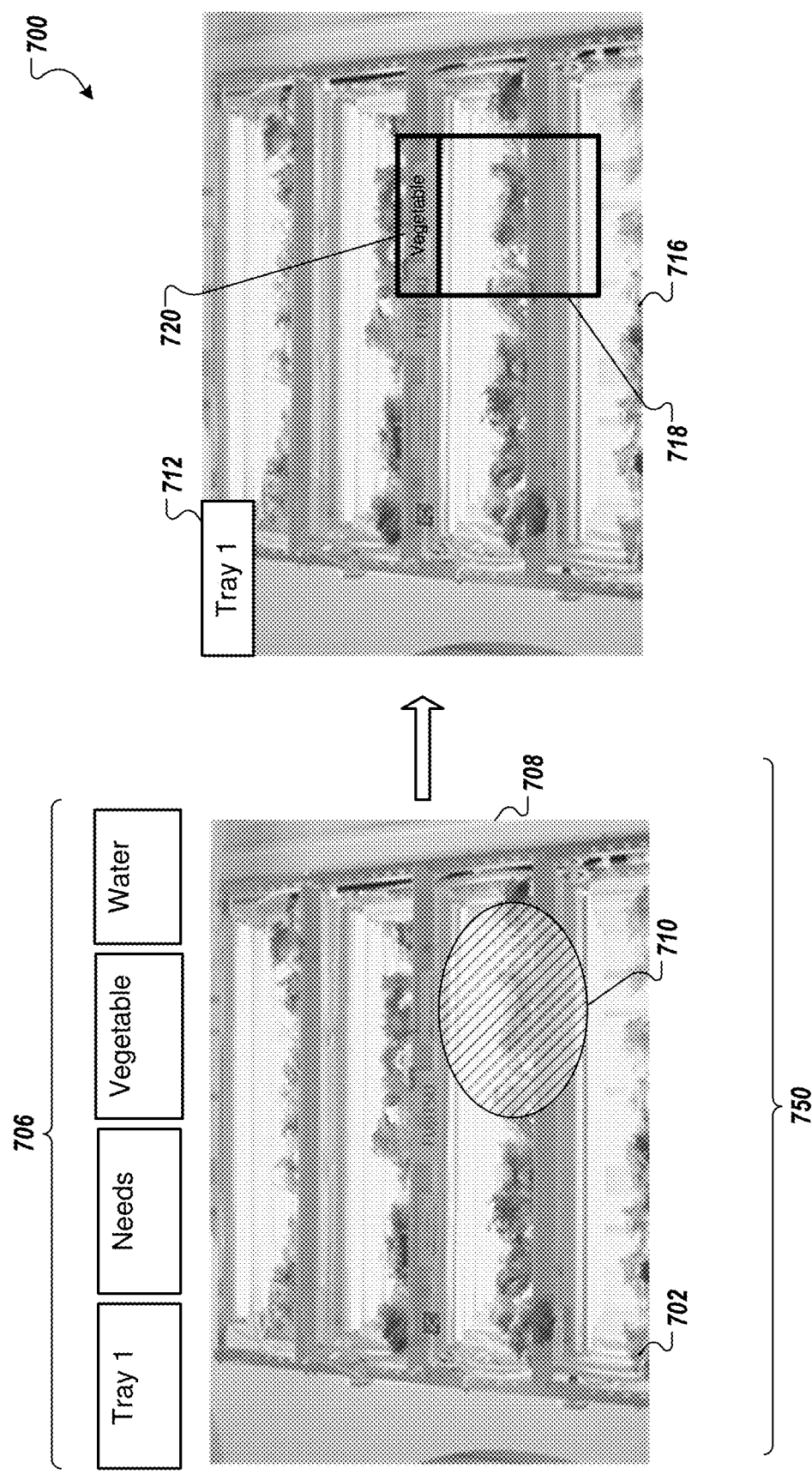
FIG. 7 illustrates an example process of creation of an annotated attention map from received inputs that may be implemented in the environment of FIG. 1.

FIG. 7 illustrates an example process 700 of creation of an annotated attention map 716 from received inputs 750. The process 700 may be performed by a learning engine of a trainer server (e.g., 118) in some embodiments. The received inputs 750 may include a natural language input 706 and/or a user sensory input 702, which may be communicated from the display device 104 of FIG. 6. The natural language input 706 may correspond to and be associated with the user sensory input 702. Accordingly, the received inputs 750 may be received together or associated at a trainer server.

In FIG. 7, the user sensory input 702 may include a frame 708 or a representation of the data presented on the display device 104. A portion 710 of the frame 708 may be highlighted or otherwise indicated as the portion of the frame 708 on which the expert user (120 of FIG. 6) focused. The portion 710 of the frame 708 may correspond in the annotated attention map 716 to a classification region 718. The classification region 718 may be include the portion 710 of the frame 708 on which the expert user focused.

The natural language input 706 may be used to generate annotations related to the frame 708 of the user sensory input 702. For example, the natural language input 706 may be used to generate labels for the environment or the classification region 718. For example, the natural language input 706 may be used to label an environment represented in the frame 708. For instance, the environment shown in the frame 708 may be "Tray 1," which may be pulled from the natural language input 706. Additionally, the natural language input 706 may be used to label 720 the classification region 718. In FIG. 7, the label 720 may include "Vegetable." The label 720 may be added to create the annotated attention map 716.

Accordingly, the learning engine may create the annotated attention map 716 based at least partially on the user sensory input 702 and the natural language input 706. The learning engine may generate annotations or labels 712 and 720 from the natural language input 706. The annotations or labels 712 and 720 may be added to create the annotated attention map 716. The annotated attention map 716 may be indicative of the portions of the presented data on which the expert user focused. In particular, the annotated attention map 716 may include the classification region 718, which may correspond to the portion 710 focused on by the expert user.

Figure 8:
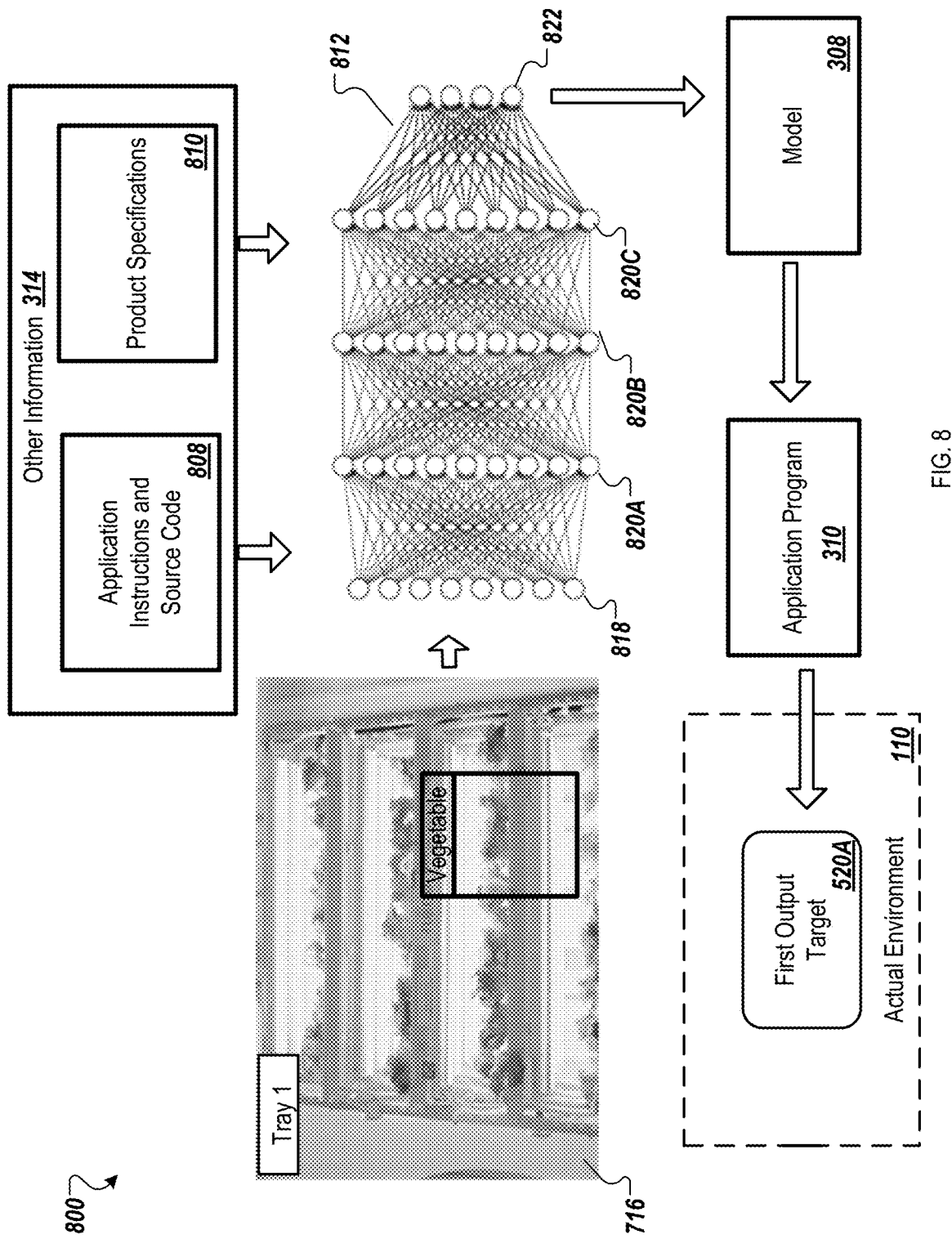
FIG. 8 illustrates a process of generating an application program for a selected first output target.

FIG. 8 illustrates a process 800 of generating an application program 310 for a selected first output target 520. For example, an expert user may select the first output target 520 using the display device 104 of FIG. 5. The process 800 may include training of a neural network 812 that receives as input the annotated attention map 716 and other information 314. The other information 314 may include application instructions 808 and product specifications 810 that may be specific to the selected first output target 520A.

The neural network 812 may receive as input the annotated attention map 716 and the other information 314 into an input layer 818. The input layer 818 may then proceed through one or more hidden layers 820A-820C (generally, hidden layer 820 of hidden layers 820) of nodes. The hidden layers 820 include intermediate calculations and/or processes to train the neural network 812 such that an anomalous activity may be identified and a remedy to the anomalous activity may be determined.

The trained neural network 812 may be optimized in the end use application. In particular, the trained neural network 812 may be optimized for the particular selected output target 820A. For instance, the other information 314 may enable optimization of the trained neural network 812 to the particular selected first output target 520A. The neural network 812 may include an output layer 822. The output layer 822 may include a set of optimized values that may be fed into the model 308 or used to create the model 308.

The model 308 may be used to generate the application program 310. For instance, the application program 310 may include the optimized values of the trained neural network 812 that are specific to the selected first output target 520A. The application program 310 may be communicated to the first output target 520A in the actual environment 110. The application program 310 may instruct the first output target 520A to identify anomalous activity and implement remedies to the identified anomalous activity.

In the depicted embodiment, for instance, the anomalous activity may include the vegetable that is identified and labeled in the annotated attention map 716. The vegetable may correspond to the classification region 718 included in the annotated attention map 716. Accordingly, the first output target 520A may then be able to identify when the vegetable needs water and implement a solution (e.g., actuate a water source).

Figure 9:
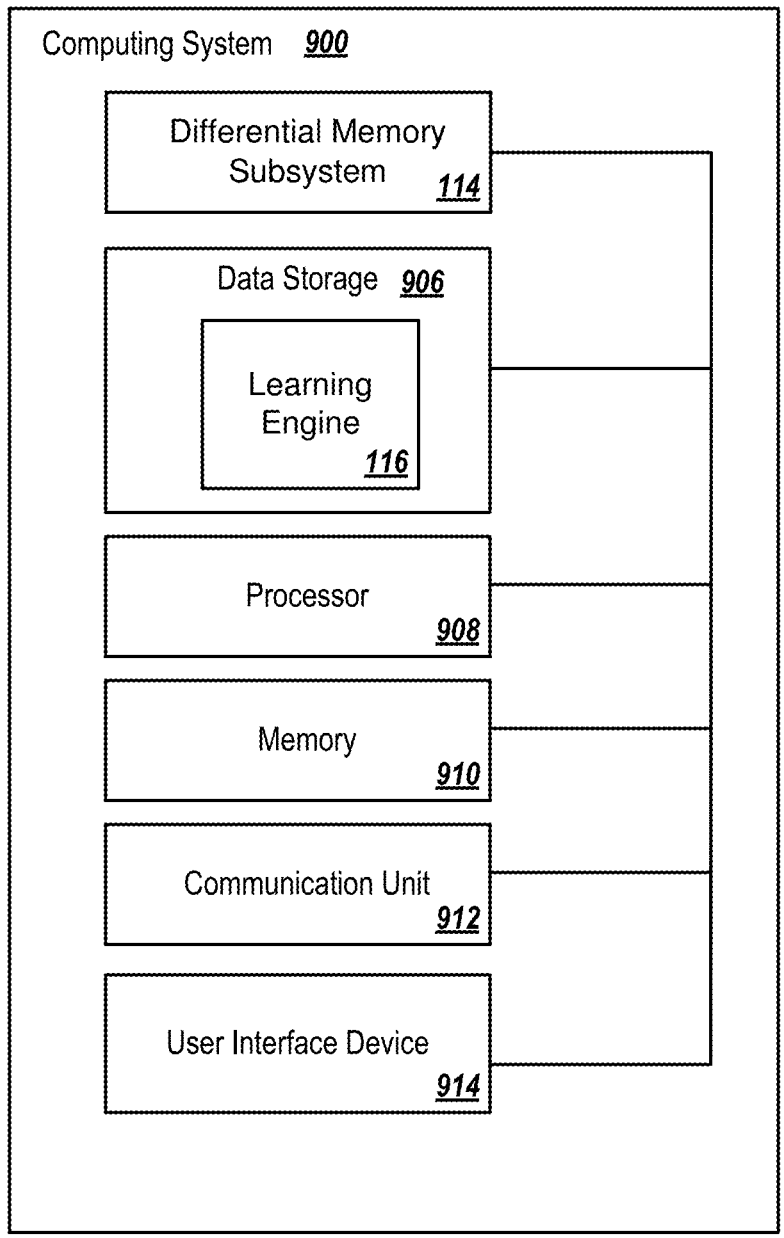
FIG. 9 is a block diagram of an example computing system that may be configured for implementation of deep neural network training for application program generation.

FIG. 9 is a block diagram of an example computing system 900 that may be configured for implementation of deep neural network training for application program generation according to at least one embodiment of the present disclosure. The computing system 900 may be implemented in the environment 100 of FIG. 1, for instance. For example, the computing system 900 may include the output target 108, the display device 104, the trainer server 118, or the expert device 202. The computing system 900 may include the DMS 114, one or more processors 908, a memory 910, a communication unit 912, a user interface device 914, and a data storage 906 that includes the learning engine 116.

The processor 908 may include any suitable special-purpose or general-purpose computer, computing entity, or processing device including various computer hardware or software modules and may be configured to execute instructions stored on any applicable computer-readable storage media. For example, the processor 908 may include a microprocessor, a microcontroller, a digital signal processor (DSP), an ASIC, an FPGA, or any other digital or analog circuitry configured to interpret and/or to execute program instructions and/or to process data.

Although illustrated as a single processor in FIG. 9, the processor 908 may more generally include any number of processors configured to perform individually or collectively any number of operations described in the present disclosure. Additionally, one or more of the processors 908 may be present on one or more different electronic devices or computing systems. In some embodiments, the processor 908 may interpret and/or execute program instructions and/or process data stored in the memory 910, the data storage 906, or the memory 910 and the data storage 906. In some embodiments, the processor 908 may fetch program instructions from the data storage 906 and load the program instructions in the memory 910. After the program instructions are loaded into the memory 910, the processor 908 may execute the program instructions.

The memory 910 and the data storage 906 may include computer-readable storage media for carrying or having computer-executable instructions or data structures stored thereon. Such computer-readable storage media may include any available media that may be accessed by a general-purpose or special-purpose computer, such as the processor 908. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 908 to perform a certain operation or group of operations.

The communication unit 912 may include one or more pieces of hardware configured to receive and send communications. In some embodiments, the communication unit 912 may include one or more of an antenna, a wired port, and modulation/demodulation hardware, among other communication hardware devices. In particular, the communication unit 912 may be configured to receive a communication from outside the computing system 900 and to present the communication to the processor 908 or to send a communication from the processor 908 to another device or network.

The user interface device 914 may include one or more pieces of hardware configured to receive input from and/or provide output to a user. In some embodiments, the user interface device 914 may include one or more of a speaker, a microphone, a display, a keyboard, a touch screen, or a holographic projection, among other hardware devices.

The learning engine 116 may include program instructions stored in the data storage 906. The processor 908 may be configured to load the learning engine 116 into the memory 910 and execute the learning engine 116. Alternatively, the processor 908 may execute the learning engine 116 line-by-line from the data storage 906 without loading them into the memory 910. When executing the learning engine 116, the processor 908 may be configured to perform an unexplored branch search as described elsewhere in this disclosure.

Modifications, additions, or omissions may be made to the computing system 900 without departing from the scope of the present disclosure. For example, in some embodiments, the computing system 900 may not include the user interface device 914. In some embodiments, the different components of the computing system 900 may be physically separate and may be communicatively coupled via any suitable mechanism. For example, the data storage 906 may be part of a storage device that is separate from a server, which includes the processor 908, the memory 910, and the communication unit 912, that is communicatively coupled to the storage device. The embodiments described herein may include the use of a special-purpose or general-purpose computer including various computer hardware or software modules, as discussed in greater detail below.

Figure 10A:
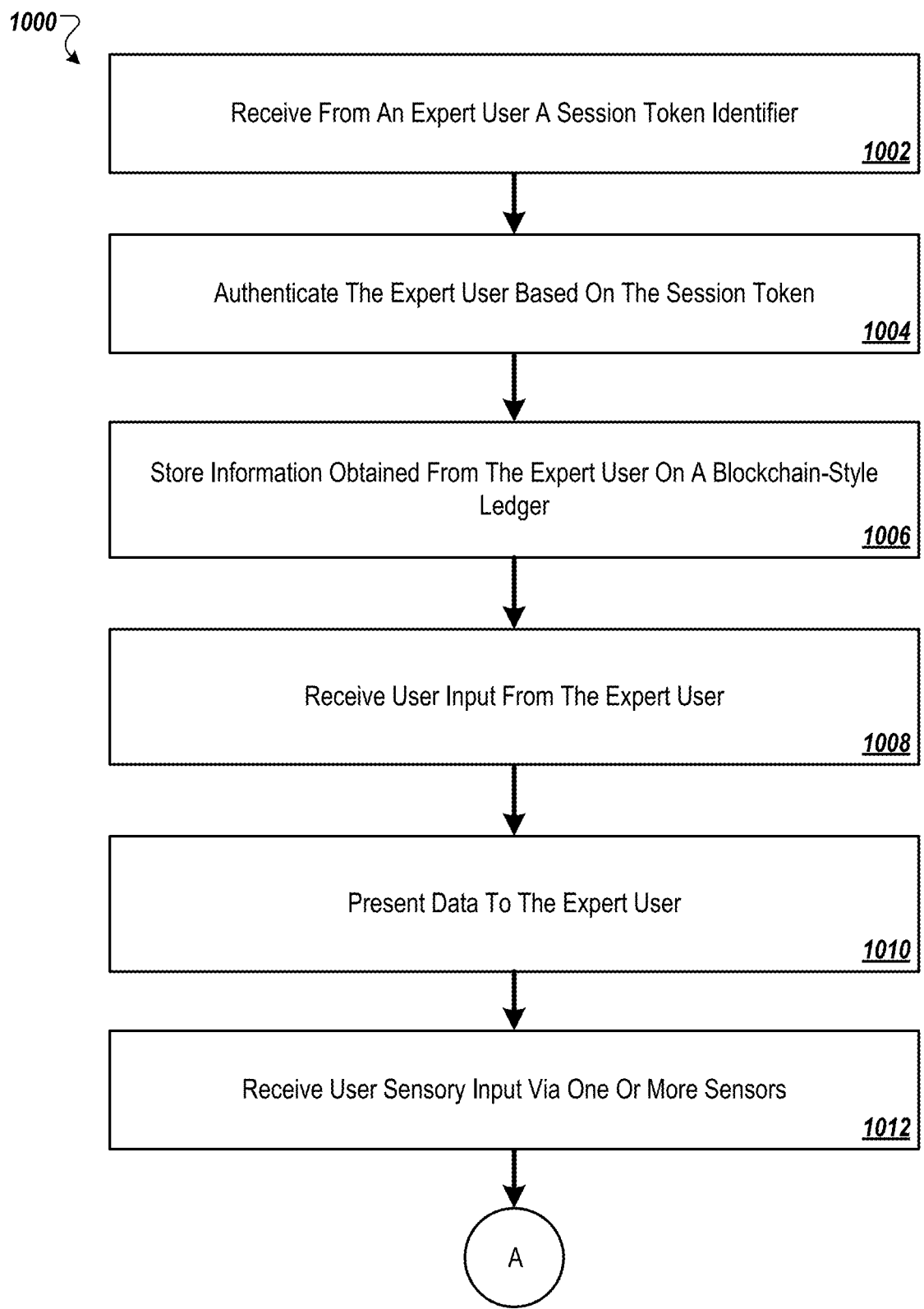
FIGS. 10A and 10B are a flowchart of an example method of deep neural network training for application program generation, all according to at least one embodiment described in the present disclosure.
Figure 10B:
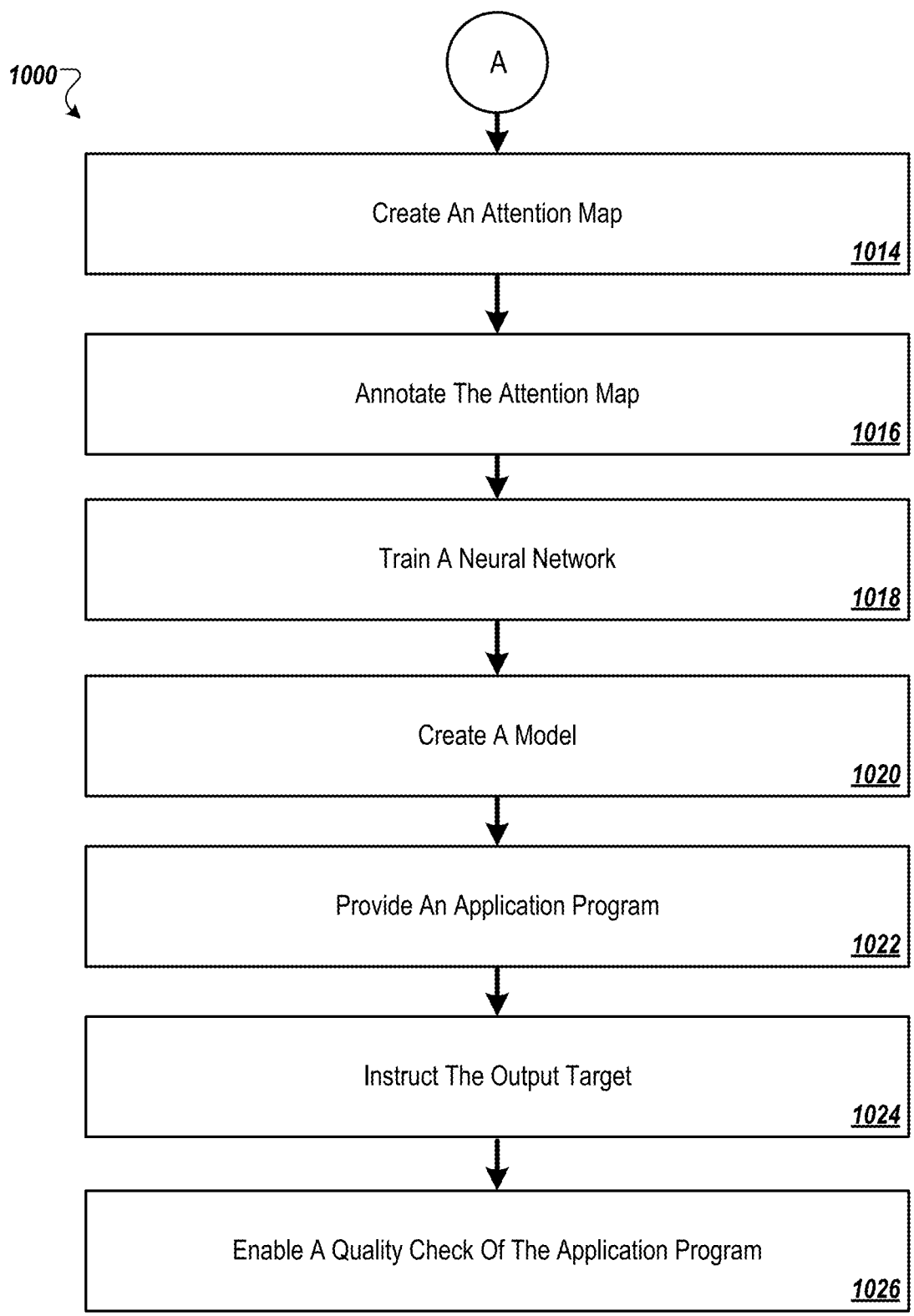

FIGS. 10A and 10B are a flowchart of an example method 1000 of deep neural network training for application program generation. The method 1000 may be performed in an environment such as the environment 100 of FIG. 1. The method 1000 may be programmably performed in some embodiments by the learning engine 116, the trainer server 118, the computing system 900 or some combination thereof. In some embodiments, a computing system (e.g., the computing system 900) including the learning engine 116 may include or may be communicatively coupled to a non-transitory computer-readable medium (e.g., the memory 910 of FIG. 9) having stored thereon programming code or instructions that are executable by one or more processors (such as the processor 908 of FIG. 9) to cause a computing system to perform or control performance of the method 1000. Additionally or alternatively, a computing system (e.g., the computing system 900) including the learning engine 116 may include the processor 908 described elsewhere in this disclosure that is configured to execute computer instructions to cause the computing system to perform or control performance of the method 1000. Although illustrated as discrete blocks, various blocks in FIGS. 10A and 10B may be divided into additional blocks, combined into fewer blocks, or eliminated, depending on the desired implementation.

The method 1000 may begin at block 1002 in which a session token may be received from an expert user. The session token may be received from an expert device that is associated with an expert user. The session token may include an identifier that indicates the expert user and/or indicates a particular session during which the expert user interfaces with or provides input to a trainer server. The session token may be communicated via a communication network such as the network 128 of FIG. 1. At block 1004, the expert user may be authenticated based on the session token. For example, a trainer server such as the trainer server 118 may be configured to authenticate a particular expert user based on the session token. At block 1006, information obtained from the expert user may be stored on a blockchain-style ledger. For example, identifying information of the expert user and/or input (described below) may be stored in the blockchain-style ledger.

At block 1008 user input may be received from the expert user. In some embodiments, the user input may include a selection of a data source from which the presented data originates and/or a selection of the output target. The output target may include a drone, a camera, or an augmented reality headset, for instance. At block 1010, data may be presented to the expert user. The data may include information related to an actual environment for which the application program is generated. For example, the data may include camera feeds from one or more locations, image data from drones, image data from satellites, indoor camera data feeds, and the like.

At block 1012, user sensory input may be received via one or more sensors. The sensors may be measuring activities and reactions of the expert user related to or in response to the presented data. The user sensory input may be received as the data is presented to the expert user. For instance, the user sensory input may be received in real time or in substantially real time. The sensors may include an RBGd camera, a gesture capture sensor, a biometric capture system, wearable sensor system, digital I/O interface, wearable ring type input, a keyboard, a mouse, an emotion recognition system, a gaze tracking system, a video interface, a microphone, a brain computer interface, a haptic interface, a wireless receiver, a high resolution camera, a thermal or infrared camera, a light sensor, a GPS, a wireless transmitter, a three-hundred and sixty degree camera, a digital optical interface, a virtual reality interface, or some combination thereof.

At block 1014, an attention map may be created. The attention map may be created based on the user sensory input. For instance, the attention map may be indicative of the portions of the presented data on which the expert user focused and including one or more data classification regions. At block 1016, the attention map may be annotated. The attention map may be annotated with the natural language input labels based on a natural language input of the expert user. For example, the expert user may comment (either verbally or via a user interface device) as the expert interacts with the presented data. Comments of the expert user may be analyzed textually and annotated on the attention map. The annotations may include labels and/or boxes referring to portions of the presented data.

At block 1018, a neural network may be trained. The neural network may be trained based on the user sensory input. For example, the annotated attention map may be used as input to a neural network and the neural network may be trained based on the annotated attention map. In some embodiments, the training may include communicating to a differential memory subsystem neural network information and/or processed user sensory input. At the differential memory subsystem, the neural network information and/or processed user sensory input may be used for experimental data processing functions. The differential memory subsystem may be physically separate from and networked to another portion of the trainer server that performs one or more of blocks 1002, 1004, 1006, 1008, 1010, 1012, 1014, 1016, or combinations thereof.

At block 1020, a model may be created or modified. The model may be created or modified based on the trained neural network that is optimized for one or more anomalous activities of an end use application. For instance, according to block 1018, the neural network may be trained based on the user sensor input as well as other input. The neural network may be trained or optimized for detection of anomalous activities and remedies thereto in an actual environment. At block 1022, an application program may be provided for the output target of the end use application. For example, the application program may be configured to detect one or more particular anomalous activities of the end use applications and one or more ways to remedy the anomalous activities.

At block 1024, the output target may be instructed via the application program to detect and remedy the anomalous activity. For example, the application program may be generated based on the trained neural network that is based on the user sensory input. The application program may then be sent or communicated to the output target. The output target may then operate according to the application program.

At block 1026, a quality check of the application program may be enabled. The quality check may be performed by one or more other expert users. The other expert users may access and/or evaluate the application program based on performance of the output target in an actual environment. In some embodiments, the quality check may include receiving from a second expert user a second session token. The second expert may be authenticated based on the second session token. A quality check session of the second expert user may be timestamped and information obtained from the second expert user to check the application program may be stored on the blockchain-style ledger.

For example, in some embodiments, the expert user may include an agriculture expert. In these and other embodiments, the attention map may include a heat map, an image with a grid overlay, or an object segmentation selection. The user sensory input may include user gaze data representative of a gaze of the agriculture expert as captured by a gaze sensor and physical touch data representative of a physical touch received on a touch screen. The natural language input of the agriculture expert user includes a voice input or a touch function. The model may be created based on the user sensory input and the neural network may be trained based on the user sensory input. The neural network may be trained for detection of an anomalous activity (e.g., a dry area, a dying vegetable, a malfunctioning sprinkler, a ripe vegetable, presence of a pest, presence of weeds, and the like) in an agricultural environment and an operation by a drone or another mechanism to cure or otherwise address the anomalous activity.

In other embodiments, the expert user may include a security expert. In these and other embodiments, the attention map may include historical footage. The user sensory input may include user gaze data representative of a gaze of the security expert as captured by a gaze sensor and an electroencephalogram and a camera representative of an emotional response. The natural language input of the security expert user may include a voice input (e.g., via a microphone). The model may be created based on the user sensory input and the neural network may be trained based on the user sensory input. The neural network may be trained for detection of an anomalous activity (e.g., presence of a security threat, presence of an explosive, and the like), in a monitored environment and an operation by a drone, a camera, an alarm or another mechanism to cure or otherwise address the anomalous activity.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. In these and other embodiments, the term "non-transitory" as explained herein should be construed to exclude only those types of transitory media that were found to fall outside the scope of patentable subject matter in the Federal Circuit decision of *In re Nuijten,* 500 F.3d 1346 (Fed. Cir. 2007). Combinations of the above may also be included within the scope of computer-readable media.

Computer-executable instructions comprise, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads).

While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A computer system architecture configured for deep neural network training, the computer system architecture comprising:
    a processor;
    a memory that includes random access memory (RAM) on which a learning engine is stored, wherein the learning engine is configured to:
      present data about a particular subject to a user having knowledge about the particular subject,
      as the data is presented to the user, receive user sensory input via one or more sensors measuring feedback and reactions of the user related to the presented data;
      create an attention map based on the user sensory input, the attention map being indicative of portions of the presented data on which the user focused and including one or more data classification regions;
      annotate the attention map with natural language input labels based on a natural language input of the user;
      train a neural network based on the annotated attention map;
      create a model based on the trained neural network that is optimized for an anomalous activity of an end use application;
      provide an application program for an output target of the end use application; and
      instruct the output target via the application program to detect and remedy the anomalous activity; and
    a differential memory subsystem that is physically separate from and networked to the memory and the processor, the differential memory subsystem being configured to receive neural network information and processed user sensory input from the learning engine for experimental data processing functions.

2. The computer system architecture of claim 1, wherein the differential memory subsystem employs operations to mimic a neural Turing machine for experimental data processing functions.

3. The computer system architecture of claim 1, wherein the learning engine is further configured to:
    receive from the user a session token identifier;
    authenticate the user based on the session token; and
    store information obtained from the user on a blockchain-style ledger.

4. The computer system architecture of claim 1, wherein the learning engine is further configured to enable a quality check of the application program.

5. The computer system architecture of claim 4, wherein the quality check includes:
    receiving from a second user a second session token identifier;
    authenticating the second user based on the second session token;
    timestamping a quality check session of the second user; and
    storing information obtained from the second user on a blockchain-style ledger.

6. The computer system architecture of claim 1, wherein:
    the user includes an agriculture user with knowledge about agriculture;
    the attention map includes a heat map, an image with a grid overlay, or an object segmentation selection;
    the user sensory input includes user gaze data representative of a gaze of the agriculture user as captured by a gaze sensor and physical touch data representative of a physical touch received on a touch screen; and
    the natural language input of the agriculture user includes a voice input or a touch function.

7. The computer system architecture of claim 1, wherein:
    the user includes a security user with knowledge about security;
    the attention map includes historical footage;
    the user sensory input includes user gaze data representative of a gaze of the security user as captured by a gaze sensor and an electroencephalogram and a camera representative of an emotional response; and
    the natural language input of the security user includes a voice input.

8. The computer system architecture of claim 1, wherein the one or more sensors includes one or more of a combination of an RBGd camera, a gesture capture sensor, a biometric capture system, wearable sensor system, digital I/O interface, wearable ring type input, a keyboard, a mouse, an emotion recognition system, a gaze tracking system, a video interface, a microphone, a brain computer interface, a haptic interface, a wireless receiver, a high resolution camera, a thermal or infrared camera, a light sensor, a GPS, a wireless transmitter, a three-hundred and sixty degree camera, a digital optical interface, and a virtual reality interface.

9. The computer system architecture of claim 1, wherein the output target includes a drone, a camera, or an augmented reality headset.

10. The computer system architecture of claim 1, wherein:
    the learning engine is further configured to receive user input from the user; and the user input includes a selection of a data source from which the presented data originates and includes a selection of the output target.

11. A method of deep neural network training for application program generation, the method comprising:
presenting, by a trainer server, data about a particular subject to a user having knowledge about the particular subject;
receiving, by the trainer server, user sensory input via one or more sensors measuring activities and reactions of the user related to the presented data as the data is presented to the user;
creating, by the trainer server, an attention map based on the user sensory input, the attention map being indicative of portions of the presented data on which the user focused and including one or more data classification regions;
annotating, by the trainer server, the attention map with natural language input labels based on a natural language input of the user;
training, by the trainer server, a neural network based on the annotated attention map, the training including communicating to a differential memory subsystem neural network information and processed user sensory input for experimental data processing functions;
creating, by the trainer server, a model based on the trained neural network that is optimized for an anomalous activity of an end use application;
providing, by the trainer server, an application program for an output target of the end use application; and
instructing, by the trainer server, the output target via the application program to detect and remedy an anomalous activity.

12. The method of claim 11, further comprising receiving user input from the user, wherein the user input includes a selection of a data source from which the presented data originates and includes a selection of the output target.

13. The method of claim 11, wherein the differential memory subsystem is physically separate from and networked to a primary memory of the trainer server.

14. The method of claim 11, further comprising:
receiving from the user a session token identifier;
authenticating the user based on the session token; and
storing information obtained from the user on a blockchain-style ledger.

15. The method of claim 11, further comprising enabling a quality check of the application program, wherein the quality check includes:
receiving from a second user a second session token identifier;
authenticating the second user based on the second session token;
timestamping a quality check session of the second user; and
storing information obtained from the second user on a blockchain-style ledger.

16. The method of claim 11, wherein:
the user includes a user with knowledge about agriculture;
the attention map includes a heat map, an image with a grid overlay, or an object segmentation selection;
the user sensory input includes user gaze data representative of a gaze of the agriculture as captured by a gaze sensor and physical touch data representative of a physical touch received on a touch screen; and
the natural language input of the agriculture user includes a voice input or a touch function.

17. The method of claim 11, wherein:
the user includes a security user with knowledge about security;
the attention map includes historical footage;
the user sensory input includes user gaze data representative of a gaze of the security user as captured by a gaze sensor and an electroencephalogram and a camera representative of an emotional response; and
the natural language input of the security user includes a voice input.

18. The method of claim 11, wherein the output target is a drone, a camera, or an augmented reality headset.

19. The method of claim 11, wherein the one or more sensors includes one or more or a combination of a RBGd camera, a gesture capture sensor, a biometric capture system, wearable sensor system, digital I/O interface, wearable ring type input, a keyboard, a mouse, an emotion recognition system, a gaze tracking system, a video interface, a microphone, a brain computer interface, a haptic interface, a wireless receiver, a high resolution camera, a thermal or infrared camera, a light sensor, a GPS, a wireless transmitter, a three-hundred and sixty degree camera, a digital optical interface, and a virtual reality interface.

20. A non-transitory computer readable medium having stored therein executable code that, in response to being executed by a processor, causes a system to perform operations, the operations comprising:
presenting, by a trainer server, data about a particular subject to a user having knowledge about the particular subject;
receiving, by the trainer server, user sensory input via one or more sensors measuring activities and reactions of the user related to the presented data as the data is presented to the user;
creating, by the trainer server, an attention map based on the user sensory input, the attention map being indicative of portions of the presented data on which the user focused and including one or more data classification regions;
annotating, by the trainer server, the attention map with natural language input labels based on a natural language input of the user;
training, by the trainer server, a neural network based on the annotated attention map, the training including communicating to a differential memory subsystem neural network information and processed user sensory input for experimental data processing functions;
creating, by the trainer server, a model based on the trained neural network that is optimized for an anomalous activity of an end use application;
providing, by the trainer server, an application program for an output target of the end use application; and
instructing, by the trainer server, the output target via the application program to detect and remedy an anomalous activity.

* * * * *